US012614877B2

(12) United States Patent
Yang et al.

(10) Patent No.: US 12,614,877 B2
(45) Date of Patent: Apr. 28, 2026

(54) CABLE CONNECTOR ASSEMBLY WITH CABLE ARRANGEMENT

(71) Applicant: Amphenol AssembleTech(Xiamen) Co.,Ltd., Xiamen (CN)

(72) Inventors: Wenchu Yang, Xiamen (CN); Zhenxing Liu, Xiamen (CN); Hang Li, Xiamen (CN); Haitao Xiong, Xiamen (CN); MinJie Zhou, Xiamen (CN)

(73) Assignee: Amphenol AssembleTech(Xiamen) Co., Ltd., Xiamen (CN)

( * ) Notice: Subject to any disclaimer, the term of this patent is extended or adjusted under 35 U.S.C. 154(b) by 306 days.

(21) Appl. No.: 18/198,904

(22) Filed: May 18, 2023

(65) Prior Publication Data

US 2023/0378696 A1 Nov. 23, 2023

(30) Foreign Application Priority Data

| | | |
|---|---|---|
| May 20, 2022 | (CN) | 202221232100.3 |
| May 20, 2022 | (CN) | 202221236440.3 |
| Sep. 30, 2022 | (CN) | 202222623097.4 |
| Nov. 1, 2022 | (CN) | 202222947171.8 |
| Nov. 11, 2022 | (CN) | 202223014662.3 |
| Dec. 7, 2022 | (CN) | 202223280656.2 |

(Continued)

(51) Int. Cl.
*H01R 12/53* (2011.01)
*H01R 12/75* (2011.01)
*H01R 13/6471* (2011.01)

(52) U.S. Cl.
CPC ......... *H01R 13/6471* (2013.01); *H01R 12/53* (2013.01); *H01R 12/75* (2013.01)

(58) Field of Classification Search
CPC .... H01R 12/53; H01R 12/75; H01R 13/6471; H01R 13/6594; H01R 13/6658
See application file for complete search history.

(56) References Cited

U.S. PATENT DOCUMENTS 6,695,641 B1 * 2/2004 Lee .......................... H01R 13/26 439/493
6,832,931 B1 * 12/2004 Wu ........................ H01R 12/592 439/701

(Continued)

FOREIGN PATENT DOCUMENTS

CN 108133784 A 6/2018
CN 207489537 U 6/2018

(Continued)

*Primary Examiner* — Abdullah A Riyami
*Assistant Examiner* — Thang H Nguyen
(74) *Attorney, Agent, or Firm* — Bayramoglu Law Offices

(57) ABSTRACT

A cable connector relates to the field of connectors. The cable connector includes an insulative body, a terminal group, a circuit board, and a plurality of cables. The terminal group is mounted in the insulative body, and the terminal group includes a first conductive terminal group and a second conductive terminal group. The circuit board is electrically connected to the first conductive terminal group. The plurality of cables include first cables, and the first cables are electrically connected to the second conductive terminal group. The cable connector can improve the capacity and speed, realize signal integrity to the largest extent, and reduce a signal loss. In addition, the connector can realize a miniaturization and lightweight design.

19 Claims, 20 Drawing Sheets

(30) Foreign Application Priority Data

Mar. 1, 2023 (CN) ......................... 202310186367.6
Mar. 21, 2023 (CN) ......................... 202320564026.3

(56) References Cited

U.S. PATENT DOCUMENTS 6,896,556 B1 * 5/2005 Wu ........................ H01R 31/06
439/660
6,976,869 B1 * 12/2005 Wu .......................... H01R 9/03
439/499
7,452,238 B1 * 11/2008 Wu ...................... H01R 12/592
439/942
8,758,030 B2 * 6/2014 Chen ...................... H01R 12/62
439/493
10,069,247 B1 * 9/2018 Tseng ..................... H01R 24/62
2006/0079119 A1 * 4/2006 Wu ...................... H01R 12/592
439/492
2015/0044911 A1 * 2/2015 Wu ........................ H01R 43/20
29/857
2015/0255905 A1 * 9/2015 Little ................. H01R 13/6585
439/78
2018/0166825 A1 * 6/2018 Ju ....................... H01R 13/6581
2022/0416458 A1 * 12/2022 Tsai ....................... H01R 12/79
2023/0025672 A1 * 1/2023 Yao ........................ H01R 12/79
2025/0017564 A1 * 1/2025 Hao ........................ A61B 8/445
2025/0364754 A1 * 11/2025 Yao ...................... H01R 13/516

FOREIGN PATENT DOCUMENTS

CN 108736258 A 11/2018
CN 211208810 U 8/2020

* cited by examiner

CABLE CONNECTOR ASSEMBLY WITH CABLE ARRANGEMENT

CROSS REFERENCE TO THE RELATED APPLICATIONS

This application is based upon and claims priority to Chinese Patent Applications No. 202221236440.3, filed on May 20, 2022; No. 202222623097.4, filed on Sep. 30, 2022; No. 202222947171.8, filed on Nov. 1, 2022; No. 202223280656.2, filed on Dec. 7, 2022; No. 202310186367.6, filed on Mar. 1, 2023; No. 202320564026.3, filed on Mar. 21, 2023; No. 202221232100.3, filed on May 20, 2022; No. 202223014662.3, filed on Nov. 11, 2022; the entire contents of which are incorporated herein by reference.

TECHNICAL FIELD

The present disclosure relates to the field of connectors, and in particular, to a cable connector.

BACKGROUND

In the prior art, a cable connector is configured to weld a cable to a printed circuit board (PCB) or connect the cable to a wiring terminal, so as to realize connection. When a high-speed cable is connected to the PCB, signal integrity may be easily decreased due to the loss in PCB cabling, a via hole and the connector. Connecting all cables to wiring terminals requires a large number of wiring terminals. If there are many cables connected, a miniaturization and lightweight design cannot be realized, and function setting of the PCB cannot be realized.

The patent with the publication number of CN108736258A provides a connector capable of reducing signal interference between double-row terminals by using a grounding pin of a grounding plate. Although the above patent improves the crosstalk problem, the grounding pin is connected to a circuit board by a vertical end portion, resulting in a narrow conductive surface. In addition, the grounding pin is arranged in an insulating base, resulting in a high risk of resonance.

An electrical connection device provided in the patent with the publication number of CN211208810U can shield noise and avoid transmission interference to ensure the quality of signal transmission. However, a conductive shielding member of the electrical connection device is arranged in an insulating body. This leads to the difficulty in mounting a shielding structure, and is not conducive to production. Moreover, the conventional cable connector has poor grounding shielding effect.

SUMMARY

An objective of the present disclosure is to provide a cable connector to overcome at least one of the above disadvantages in the prior art.

In order to achieve the objective, the present disclosure adopts the following technical solutions:

A cable connector according to the present disclosure includes an insulative body, a terminal group, a circuit board, and a plurality of cables, where the terminal group is mounted in the insulative body, and the terminal group includes a first conductive terminal group and a second conductive terminal group; the circuit board is electrically connected to the first conductive terminal group; the cables include first cables, and the first cables are electrically connected to the second conductive terminal group.

Beneficial Effects

Some cables are electrically connected to the circuit board, and some cables are electrically connected to the terminal group, so that cables can be directly connected to terminals or can be connected to the circuit board as required, thereby improving the capacity and speed, realizing signal integrity to the largest extent, and reducing a signal loss. In addition, the connector can realize a miniaturization and lightweight design.

DETAILED DESCRIPTION OF THE EMBODIMENTS

The present disclosure will be further described with reference to the accompanying drawing and specific implementations.

Embodiment 1

Figure 1:
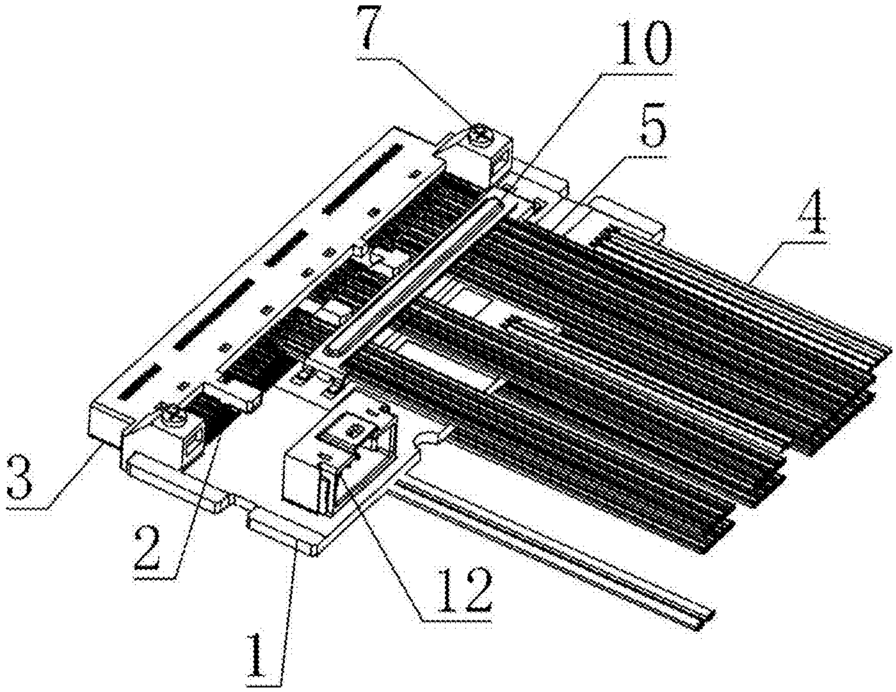
FIG. 1 is a perspective view of Embodiment 1.
Figure 2:
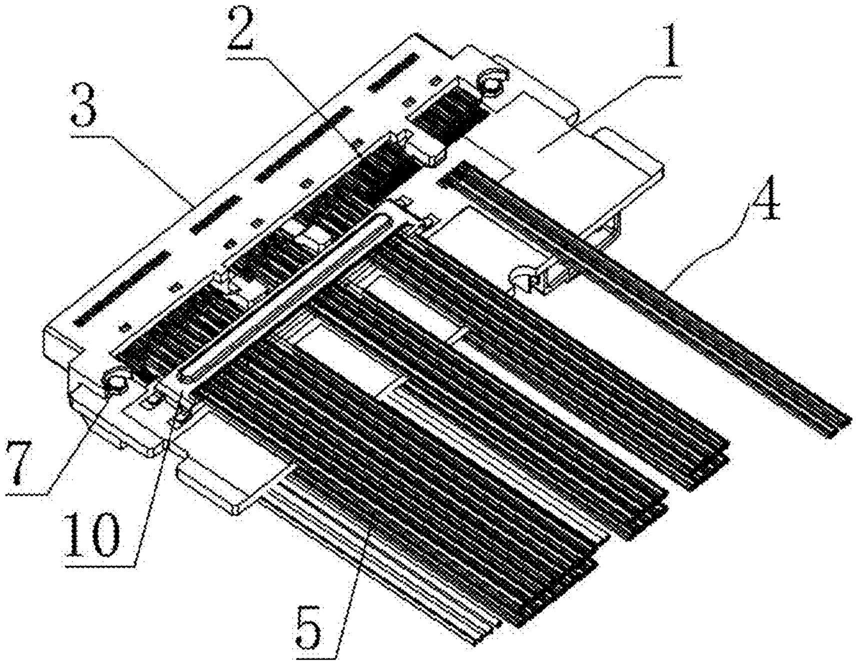
FIG. 2 is a perspective view of Embodiment 1 from another perspective.
Figure 3:
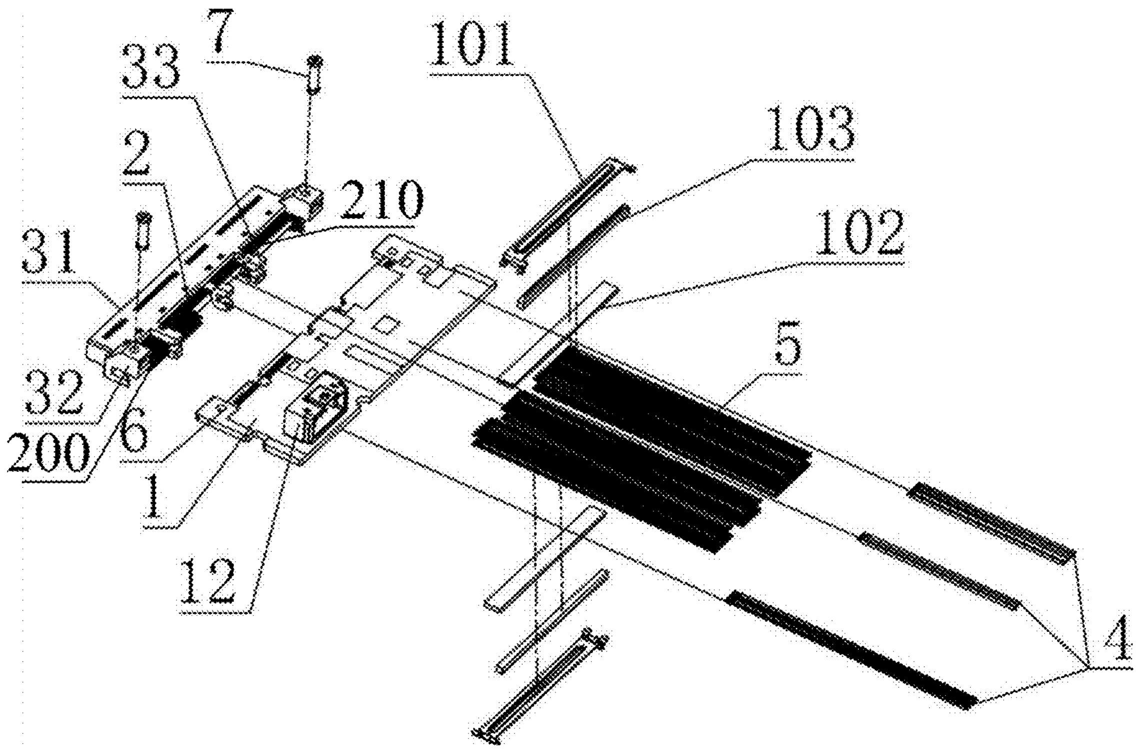
FIG. 3 is a schematic exploded view of FIG. 1.

As shown in FIGS. 1 to 3, a cable connector in this embodiment includes insulative body 3, terminal group 2, circuit board 1, a plurality of cables, power supply connector 12, and cable fixing assembly 10.

The terminal group 2 is mounted in the insulative body 3, and the terminal group includes first conductive terminal group 200 and second conductive terminal group 210. The circuit board 1 is electrically connected to the first conductive terminal group, and the circuit board 1 is a printed circuit board assembly (PCBA) or a PCB. The cables include second cable 4 and first cables 5. The second first cables 4 are electrically connected to circuit board 1, and the first cables 5 are electrically connected to the second conductive terminal group. The power supply connector 12 is arranged on the circuit board 1 to be electrically connected to the circuit board 1.

Certainly, in other embodiments, the circuit board is provided with a first connector, an end of the second cable is connected to a second connector, and the second cable is electrically connected to the circuit board through butt joint of the first connector and the second connector.

The second cable 4 is a low-speed signal cable or a power signal cable. The first cable 5 is a high-speed signal cable. The first cable 5 may be a serial attached SCSI (SAS) cable or a coaxial cable. The SAS cable may have a structure as described in the patent with the publication number of CN108133784A, the patent with the publication number of CN207489537U, etc.

Figure 5:
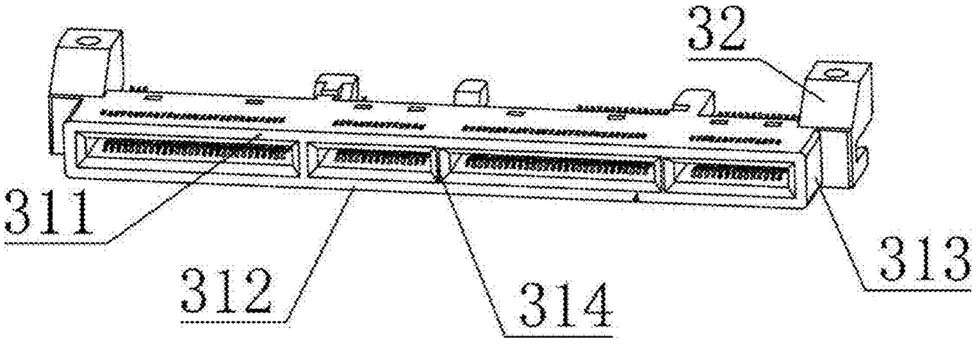
FIG. 5 is a schematic structural diagram of an insulative body according to Embodiment 1.
Figure 6:
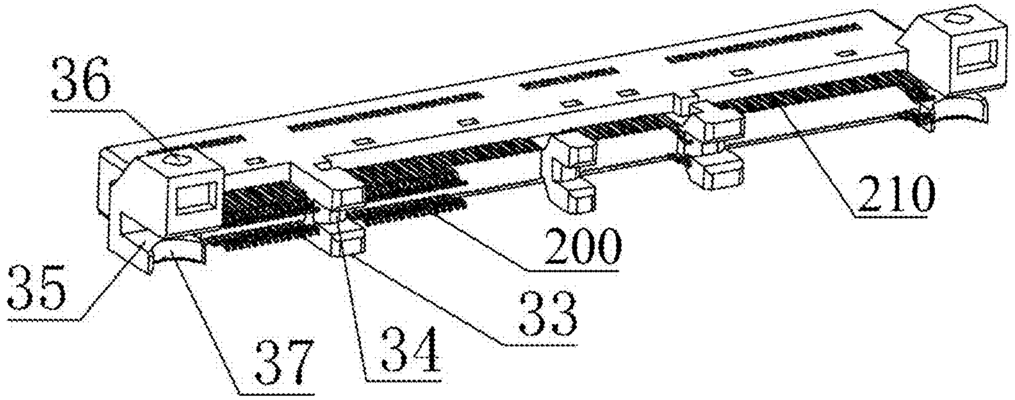
FIG. 6 is a schematic structural diagram of the insulative body according to Embodiment 1 from another perspective.

As shown in FIG. 5 to FIG. 6, the insulative body 3 includes butt portion 31, mounting portion 32, and a plurality of partition pieces 33. The butt portion 31 includes upper wall 311, lower wall 312, two first side walls 313 and a plurality of intermediate partitions 314, where the two first side walls 313 are located at two side ends respectively and connected to the upper wall 311 and the lower wall 312; the intermediate partitions 314 are arranged between the upper wall 311 and the lower wall 312, and the intermediate partitions 314 divide the insulative body 3 into a plurality of accommodating spaces for mounting the terminal group 2. In this embodiment, three intermediate partitions 314 divide the insulative body 3 into four accommodating spaces. The terminal group 2 is arranged in groups in the plurality of accommodating spaces, respectively.

The partition pieces 33 are located on a rear side of the butt portion 31 and correspond to the intermediate partitions 314 in position, the first cables 5 are arranged in groups to be welded to the terminal group 2, and the partition piece 33 spaces apart two adjacent groups of first cables 5. Middle portion of the partition piece 33 is provided with a first avoidance groove 34.

The mounting portions 32 are arranged at two side ends of the butt portion 31, and the circuit board 1 is fixedly connected to the mounting portions 32. Specifically, a middle portion of the mounting portion 32 is provided with second avoidance groove 35, and coaxial mounting positions are provided above and below the second avoidance groove 35. The mounting positions in this embodiment include mounting hole 36 and mounting groove 37, the circuit board 1 is provided with first through hole 6, the circuit board 1 is inserted into the first avoidance groove 34 and the second avoidance groove 35 to allow the first through hole 6 to be coaxial with the mounting hole 36 and the mounting groove 37, and connecting body 7 sequentially passes through the mounting hole 36, the first through hole 6 and the mounting groove 37 to realize connection and locking between the insulative body 3 and the circuit board 1. In this embodiment, the connecting body 7 is a bolt and a nut.

The cable connector further includes a cable fixing assembly, where a non-electrical connection area of the first cable is fixed to the circuit board and/or the insulative body through the cable fixing assembly. The cable fixing assembly is arranged on the insulative body, and is not arranged on the circuit board, so that the cable fixing assembly is suitable for electrical connectors with or without circuit boards, thereby making the mounting very convenient. By arranging the cable fixing assembly in the non-electrical connection area of the first cable to be connected to the insulative body, the cable fixing assembly is prevented from affecting the impedance of an electrical connection area between the first cable and the second conductive terminal group, so that the impedance of the electrical connection area between the first cable and the second conductive terminal group is not reduced.

Figure 4:
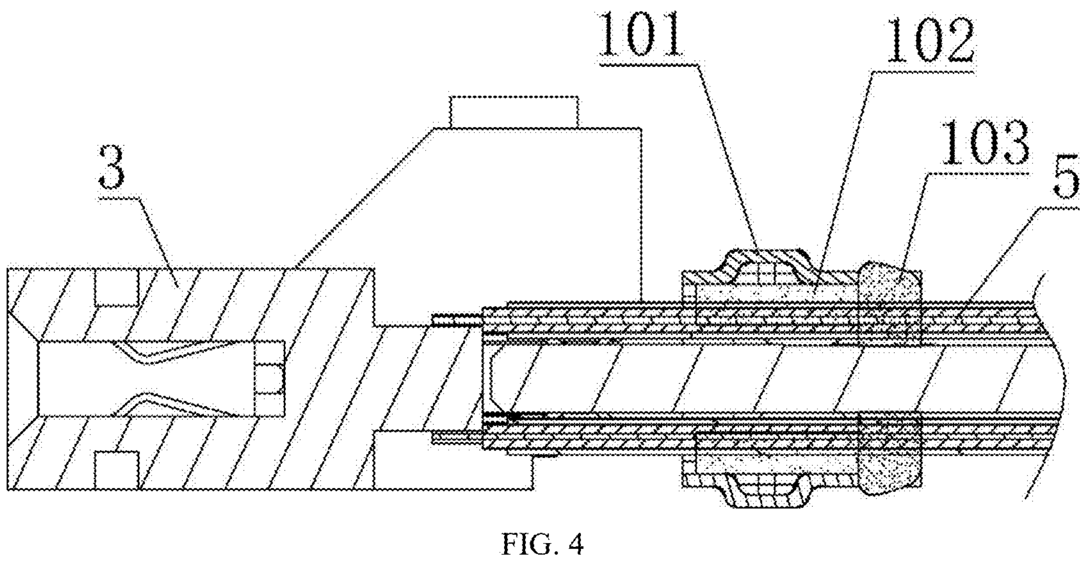
FIG. 4 shows a schematic partial cross-sectional diagram of Embodiment 1.

As shown in FIG. 4, the cable fixing assembly 10 includes first housing 101, covering layer 102, and adhesive layer 103. In this embodiment, the covering layer 102 covers the insulating layer of the first cable 5. The first housing 101 is arranged above the covering layer 102 to tightly press the covering layer 102, and the first housing 101 is fixedly connected to the circuit board 1 or the insulative body 3. In order to better fix the first cable 5 to the circuit board 1, the first cable 5 is first coated or molded on the circuit board 1 by the adhesive layer 103, and then the covering layer 102 and the first housing 101 are arranged on a side of the adhesive layer 103, so that the first cable 5 can be prevented from being pulled and thus loosened from the terminal group 2, resulting in connection failure.

In another implementation, the cable fixing assembly 10 is also arranged on the second cable 4: The covering layer 102 covers the insulating layer of the second cable 4, and the first housing 101 tightly presses the covering layer 102 and is fixed to the circuit board 1, thereby preventing connection failure caused by the second cable 4 being pulled and thus loosened from the circuit board 1.

Figure 7:
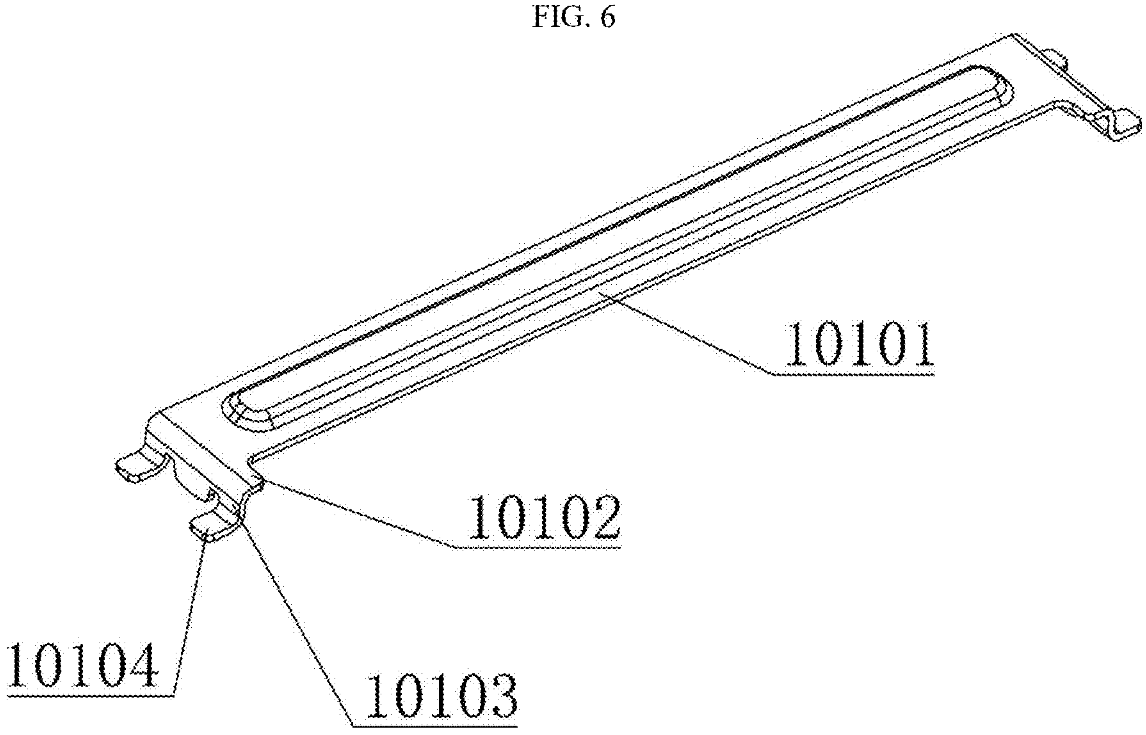
FIG. 7 is a schematic structural diagram of a first housing according to Embodiment 1.

As shown in FIG. 7, the first housing 101 includes main crimping portion 10101, rear crimping portions 10102, second side walls 10103, and welding pins 10104. The main crimping portion 10101 tightly presses the covering layer 102, two sides of the main crimping portion 10101 extend backwards to form the rear crimping portions 10102, and the rear crimping portions 10102 are configured to tightly press the adhesive layer 103. The two sides of the main crimping portion 10101 extend downwards to form the second side walls 10103, and the welding pins 10104 are formed by bending bottom ends of the second side walls 10103. The welding pins 10104 are welded and fixed to the circuit board 1.

The covering layer 102 is made of a low dielectric constant material or an insulating material, and the low dielectric constant material has a dielectric coefficient less than 2.3. In this embodiment, foam is selected as the covering layer 102. The adhesive layer 103 is an ultraviolet (UV) adhesive.

The UV adhesive and the first housing 101 are used for dual protection of the connection stability between the first cable 5 and the circuit board 1. The covering layer 102 tightly presses the first cable 5 and the circuit board 1, which can ensure the firm and stable connection between the first cable 5 and the circuit board 1, enables the impedance of a welding area not to be affected by a dielectric constant of a material of a fixed pad, thereby making the impedance more stable.

Embodiment 2

Figure 8:
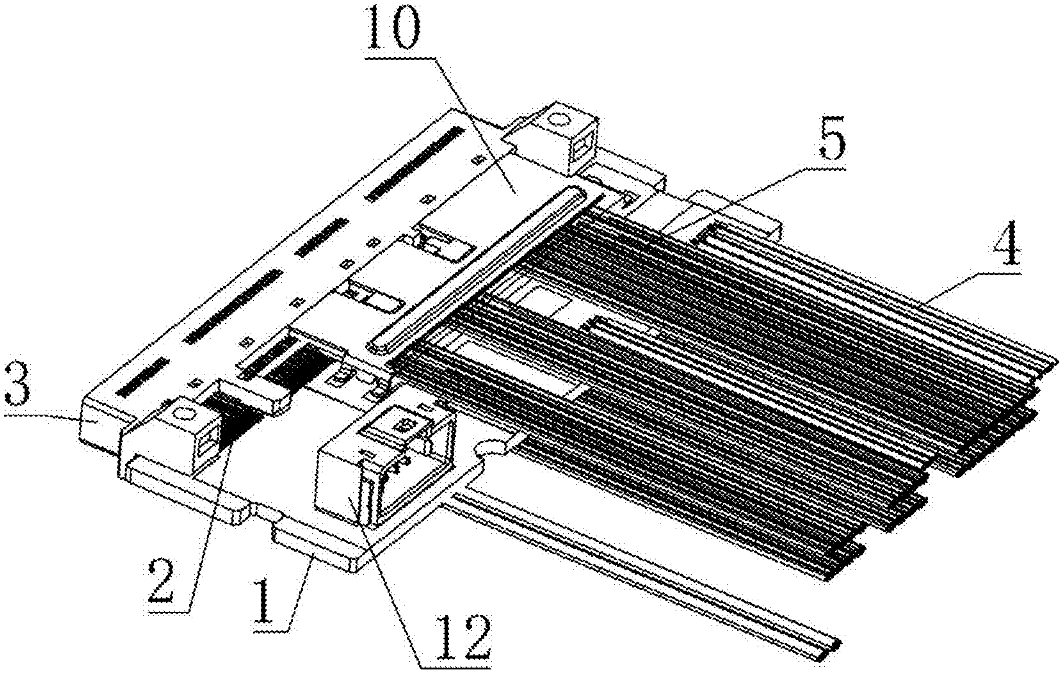
FIG. 8 is a perspective view of Embodiment 2.
Figure 9:
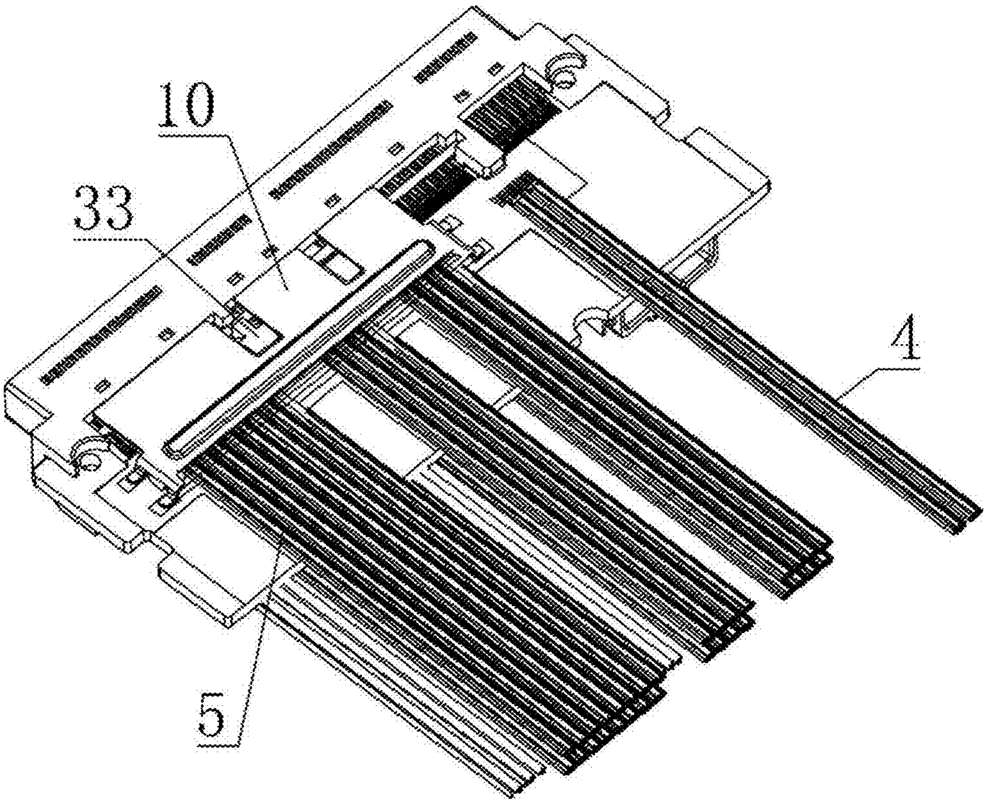
FIG. 9 is a perspective view of Embodiment 2 from another perspective.
Figure 10:
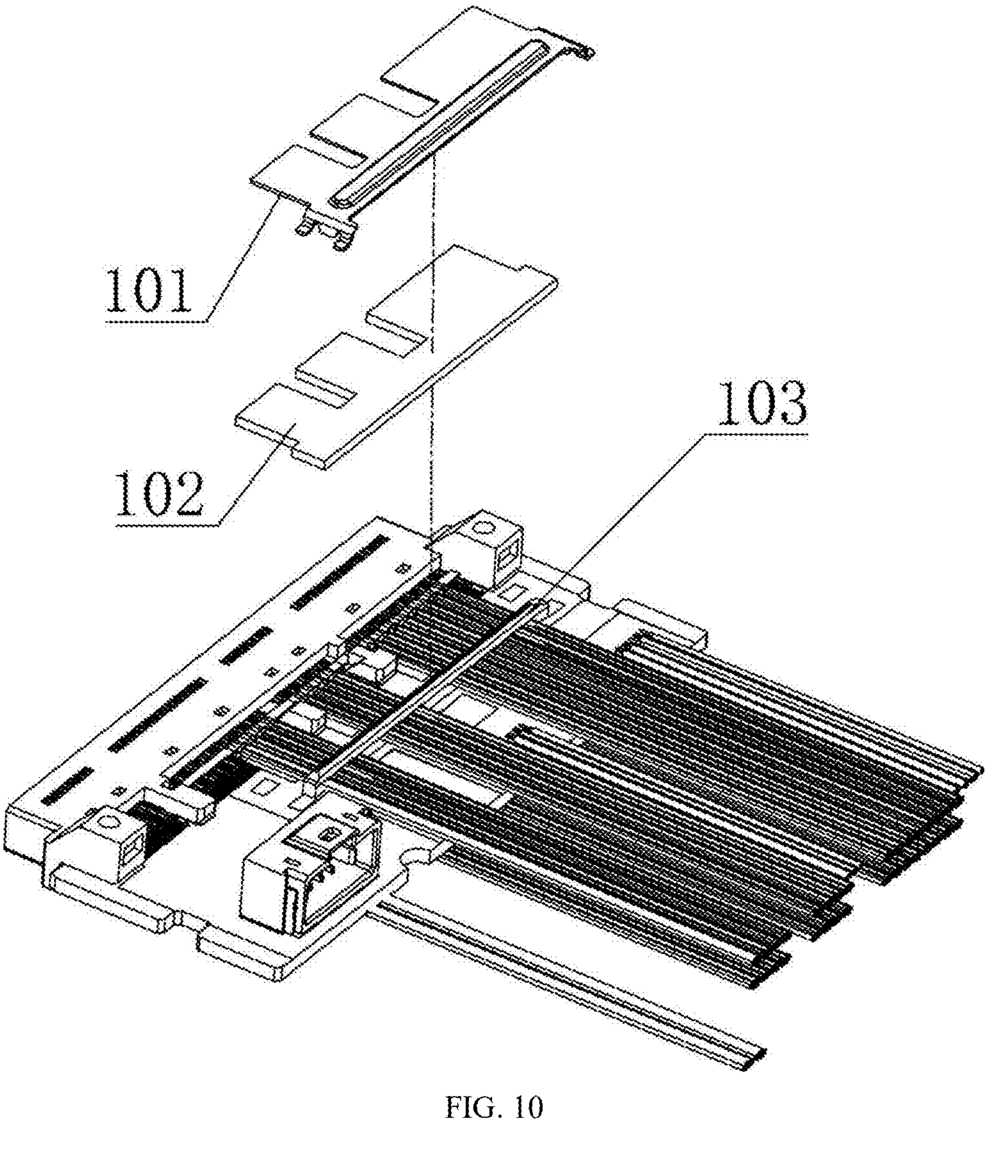
FIG. 10 is a schematic exploded view of FIG. 8.

As shown in FIGS. 8-10, this embodiment differs from Embodiment 1 in that an arrangement position of the cable fixing assembly 10 in this embodiment is different from that in Embodiment 1.

The cable fixing assembly 10 includes first housing 101, covering layer 102, and adhesive layer 103. The covering layer 102 covers an electrical connection area between each first cable 5 and terminal group 2 (i.e., a welding area between the first cable 5 and the terminal group 2). The first housing 101 is arranged above the covering layer 102 to tightly press the covering layer 102, and the first housing 101 is fixedly connected to the circuit board 1. In another implementation, the first housing 101 may also be fixedly connected to insulative body 3. The adhesive layer 103 is coated or molded between an insulating layer of the first cable 5 and the circuit board 1. By arranging the cable fixing assembly 10, the connection failure caused by the first cable 5 being pulled and thus loosened from the terminal group 2 can be prevented, and the cable fixing assembly covers a welding area of the first cable 5, which can achieve insulating, waterproof and dustproof functions.

In another implementation, the cable fixing assembly 10 is also arranged in an electrical connection area between each second cable 4 and the circuit board 1 (i.e., a welding area between the second cable 4 and the circuit board 1). The first housing 101 tightly presses the covering layer 102 and is fixed to the circuit board 1. Therefore, the connection failure caused by the second cable 4 being pulled and thus loosened from the circuit board 1 is prevented, and the cable fixing assembly covers a welding area of the second cable 4, which can achieve insulating, waterproof and dustproof functions.

Embodiment 3

Figure 11:
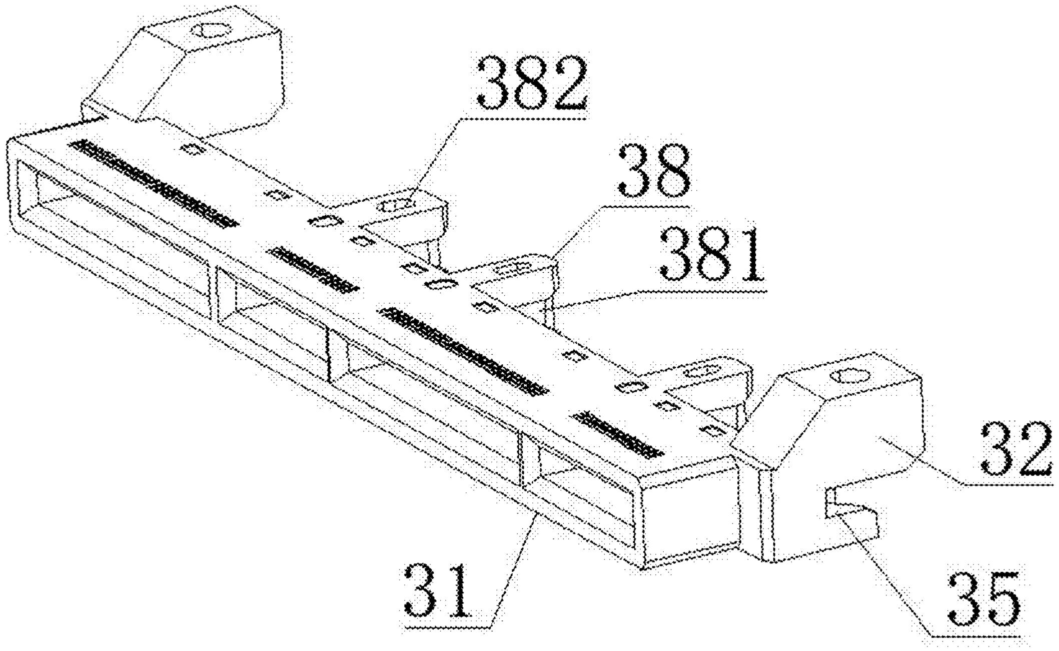
FIG. 11 is a schematic perspective structural diagram of an insulative body according to Embodiment 3.
Figure 12:
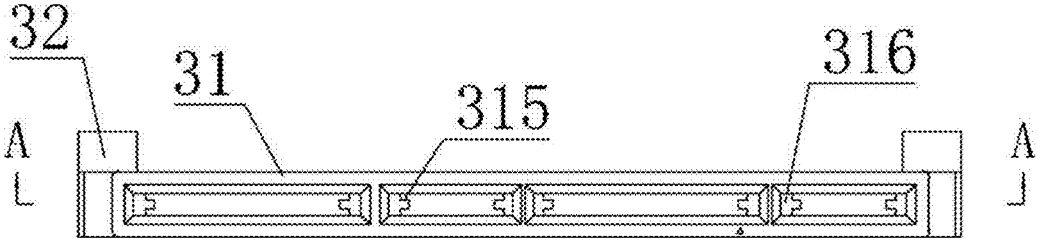
FIG. 12 is a schematic structural front view of the insulative body according to Embodiment 3.
Figure 13:
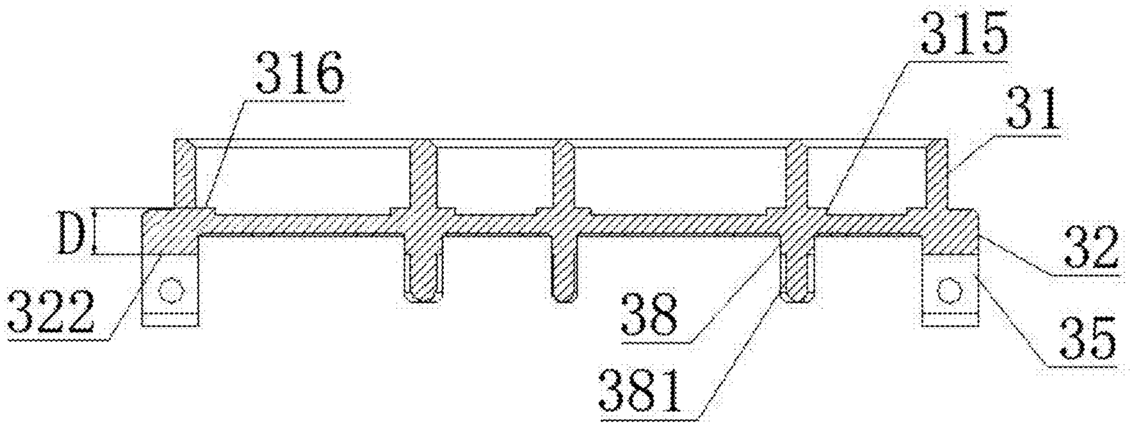
FIG. 13 is a schematic structural diagram of a cross-section taken along a direction A-A of FIG. 12.

As shown in FIGS. 11-13, this embodiment differs from Embodiment 1 in that the structure of insulative body 3 in this embodiment is different from that in Embodiment 1.

As shown in a direction of FIG. 11, the insulative body 3 includes butt portion 31 and mounting portions 32 arranged at front and rear side ends of the butt portion 31. An inner wall (left side wall) of a second avoidance groove 35 is first reference end face 322, and there are four accommodating spaces in the butt portion 31. Two protruding portions 315 are arranged on the inner wall of each accommodating space. An end face (left side face) of each protruding portion 315 adjacent to an opening of the accommodating space is second reference end face 316 against which an insert abuts. A vertical distance between the first reference end face 322 and the second reference end face 316 is D, D is greater than 2 mm, and preferably, D=3-6 mm. In this embodiment, D=4.09 mm. Since the protruding portion 315 is located in an insertion path of the insert, the insert can be better limited, and the protruding portion 315 forms in-place blocking for the insert, to prevent the insert from directly abutting against an inner end wall of the accommodating space, so that the insulative body 3 can bear a greater insertion impact force. The protruding portion 315 in this embodiment is integrally formed with the butt portion 31. Certainly, in other embodiments, the protruding portion 315 may also be mounted in the accommodating space in a subsequent mounting manner, such as welding, clamping, and screwing. By controlling the distance from the first reference end face 322 to the second reference end face 316, the relevant industry standards can be met. Specifically, the insert may be a PCB, a board card, an expansion card, a connector, etc.

There are two protruding portions 315 in each accommodating space, and the two protruding portions 315 are arranged on inner walls of two opposite sides of the accommodating space respectively, and are symmetrically arranged along a center of the accommodating space. With the arrangement of the two protruding portions 315, two ends of the insert are stressed more uniformly when subjected to a blocking force, thereby avoiding insertion deviation.

Three positioning portions 38 are arranged on a right side of the butt portion 31, the positioning portion 38 and the mounting portions 32 are located on a same side, and front and rear first side walls 313 of the positioning portion 38 are provided with positioning grooves 381 configured to position and guide the circuit board 1. The arrangement of the positioning groove 381 facilitates the mounting and positioning of the circuit board 1.

Upper and lower first side walls 313 of the positioning portion 38 are provided with clamping grooves 382, and the clamping grooves 382 and the positioning grooves 381 are located in different planes. Through the arrangement of the clamping grooves 382 and a protruding structure on another connector, the assembly and positioning with the another connector is facilitated.

When an insert on a board end connector is inserted into the cable connector through the accommodating space (insertion port), the insert can be better limited since the protruding portion 315 is on the insertion path of the insert.

Embodiment 4

Figure 14:
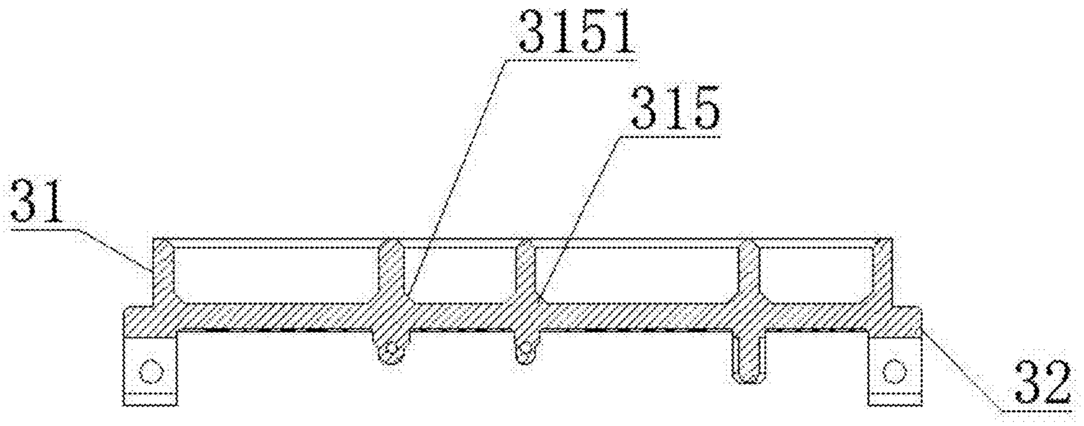
FIG. 14 is a schematic cross-sectional structural diagram of an insulative body according to Embodiment 4.

As shown in FIG. 14, this embodiment differs from Embodiment 3 in that the structure of protruding portion 315 in this embodiment is different from that in Embodiment 3.

An end face of the protruding portion 315 in this embodiment adjacent to an opening of the accommodating space is inclined surface 3151 against which an insert abuts. The insert in this embodiment is a PCB. Since an insertion end of the insert is at an oblique angle, the arrangement of the inclined surface 3151 can increase a limiting area between the insert and an insulating body, and the strength is better.

Embodiment 5

Figure 15:
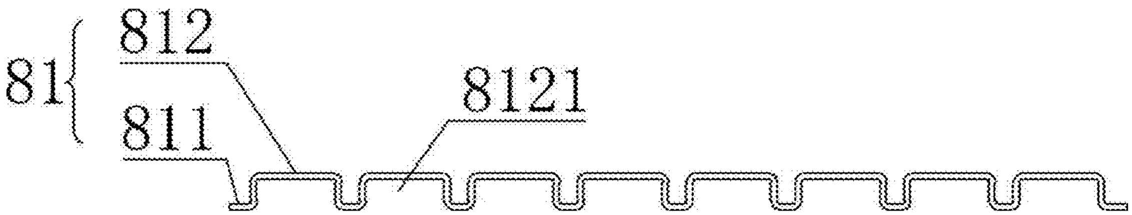
FIG. 15 is a schematic structural front view of a first conductive member according to Embodiment 5.
Figure 16:
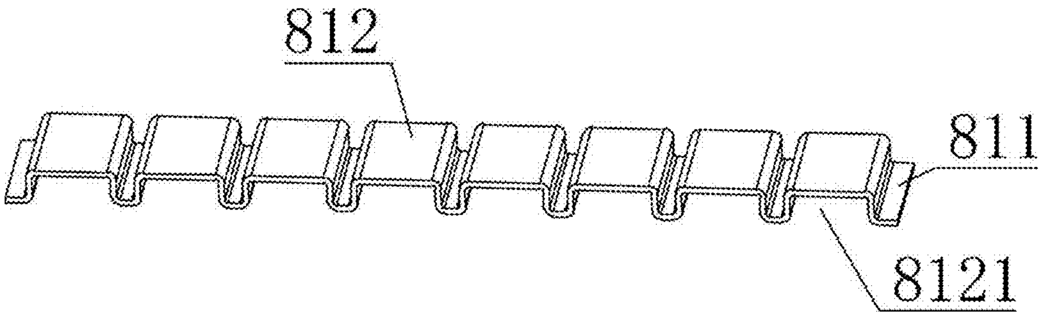
FIG. 16 is a schematic perspective structural diagram of the first conductive member according to Embodiment 5.
Figure 17:
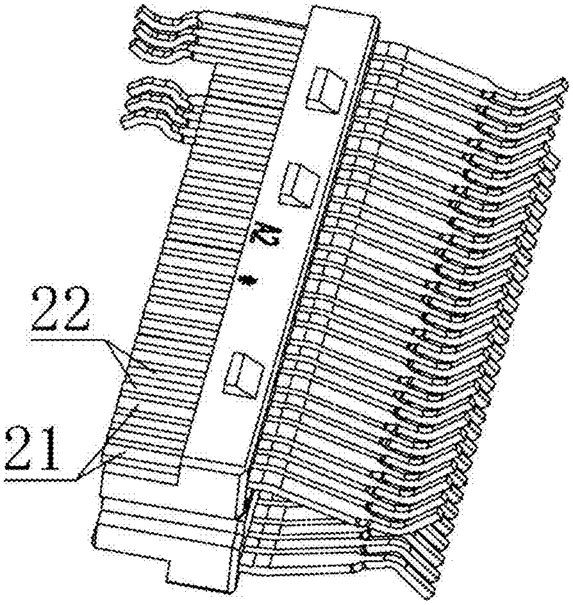
FIG. 17 is a schematic perspective structural diagram of a terminal group according to Embodiment 5.

As shown in FIGS. 15 to 17, this embodiment differs from Embodiment 1 in that this embodiment further includes first conductive member 8.

Specifically, a part of the terminal group 2 extends out of the insulative body 3 to be welded to the first cable 5 and the circuit board 1, and at least one first conductive member 8 is further included. Each first conductive member 8 is electrically connected to a grounding terminal 21 of the terminal group 2 extending out of the insulative body 3. The first conductive member 8 connects at least two grounding terminals 21, and ground wire 51 of the first cable 5 is electrically connected to the first conductive member 8. By arranging the first conductive member 8 outside the insulative body 3, the mounting is more convenient, and the problem of inconvenience in mounting of the conductive structure occurring in the conventional arrangement of the conductive structure in the insulative body 3 is solved. A part of the terminal group 2 extending out of the insulative body 3 is electrically connected to the first conductive member 8, and the ground wire 51 of the first cable 5 is electrically connected to the first conductive member 8, which has an excellent grounding shielding effect. Specifically, by electrically connecting the grounding terminals 21 to the ground wire 51 through the first conductive member 8, a conductive path can be provided between the grounding terminals 21 to control or suppress undesirable resonance occurring in the grounding terminals 21 during the operation of the cable connector, thereby improving signal integrity. Certainly, in other embodiments, the first conductive member may also be electrically connected to a grounding terminal on the circuit board.

The first conductive member 8 is formed by bending a metal sheet to form two or more conductive units 81, and the conductive unit 81 is integrally arranged, and connects two adjacent grounding terminals 21.

The conductive unit 81 includes extension portions 811 and covering portion 812, and the covering portion 812 is concave. The left and right ends of the covering portion 812 are provided with the extension portions 811, and each of the extension portions 811 has a thickness of 0.1 mm. Covering area 8121 is provided inside the covering portion 812, the covering area 8121 has a depth of 0.5 mm, and each of the extension portions 811 has a width of 0.35 mm. A ratio of the width of the covering area 8121 to the width of the extension portion 811 is 4.3.1. By setting the above dimensions, not only the grounding shielding effect is improved, but also short circuit caused by contact between a signal terminal pair and the covering portion 812 is avoided with a minimum occupied space. The extension portion 811 is electrically connected to the grounding terminals 21, and the covering portion 812 covers a signal terminal pair between adjacent grounding terminals 21. By arranging the covering portion 812 and the extension portions 811, signal terminal pairs are separated, so that signal crosstalk between signal terminals 22 can be prevented, thereby improving the signal integrity. Two adjacent covering portions 812 share one extension portion 811. The ground wire 51 is welded to the conductive unit 81. Each first cable 5 in this embodiment has one ground wire 51, and the ground wire 51 is welded to an upper side wall of the covering portion 812. Certainly, in other embodiments, the ground wire 51 may abut against the upper side wall of the covering portion 812.

The terminal group of this embodiment further includes grounding terminals, signal terminals are provided between adjacent grounding terminals, and one signal terminal pair is provided between every two adjacent grounding terminals 21. Each signal terminal pair includes two signal terminals 22.

Embodiment 6

Figure 18:
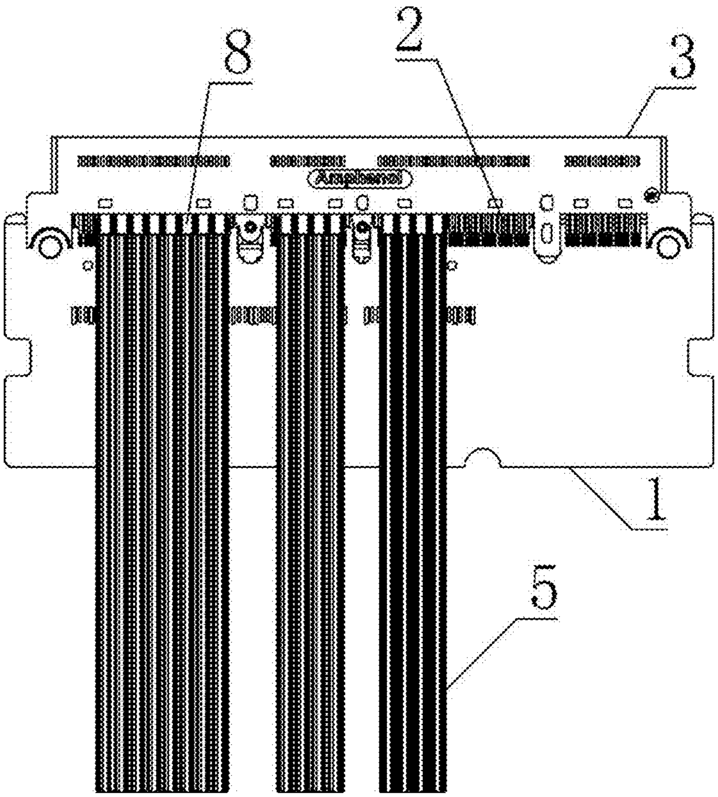
FIG. 18 is a schematic partial structural top view of a cable connector according to Embodiment 6.
Figure 19:
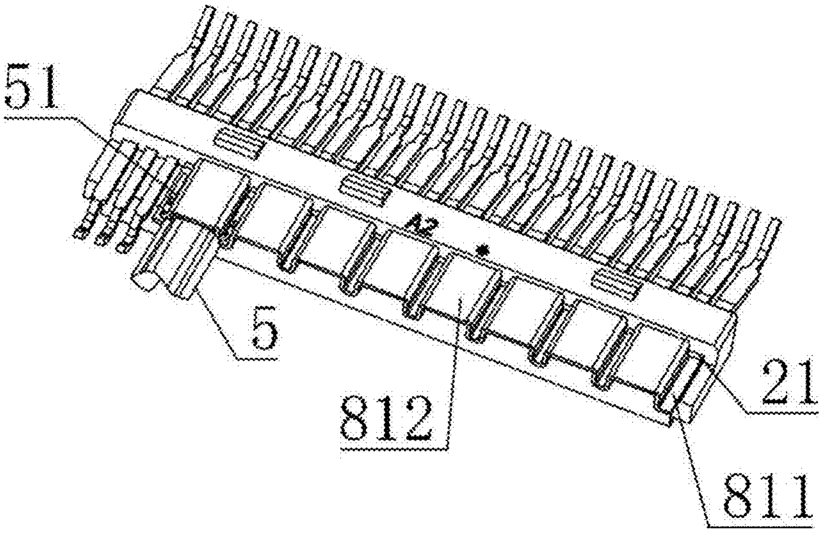
FIG. 19 is a schematic partial perspective structural diagram of the cable connector according to Embodiment 6.

As shown in FIGS. 18 and 19, this embodiment differs from Embodiment 5 in that there are a different number of ground wires 51.

Each first cable 5 in this embodiment has two ground wires 51, and the two ground wires 51 are welded to upper side walls of two extension portions 811 of the corresponding conductive unit 81 respectively. Certainly, in other embodiments, the ground wire 51 may abut against the upper side wall of the extension portion 811.

Embodiment 7

Figure 20:
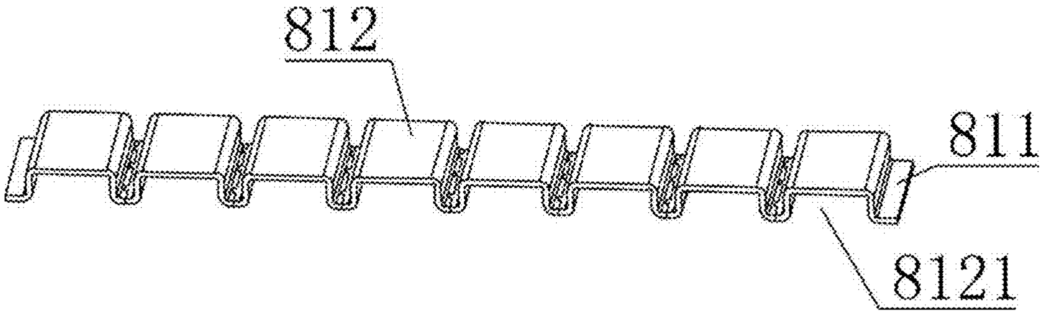
FIG. 20 is a schematic perspective structural diagram of a first conductive member according to Embodiment 7.
Figure 21:
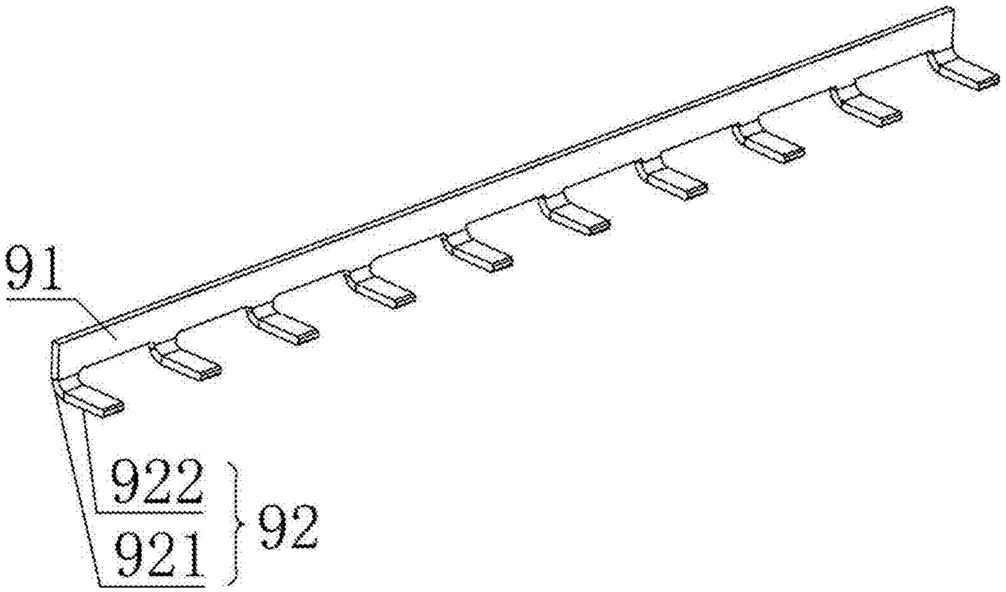
FIG. 21 is a schematic perspective structural diagram of a second conductive member according to Embodiment 8.
Figure 22:
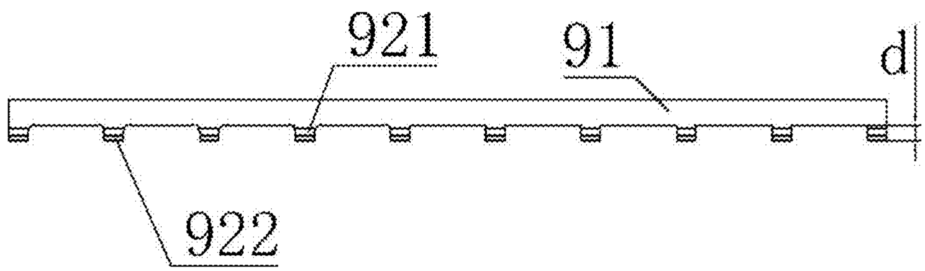
FIG. 22 is a schematic structural front view of the second conductive member according to Embodiment 8.
Figure 23:
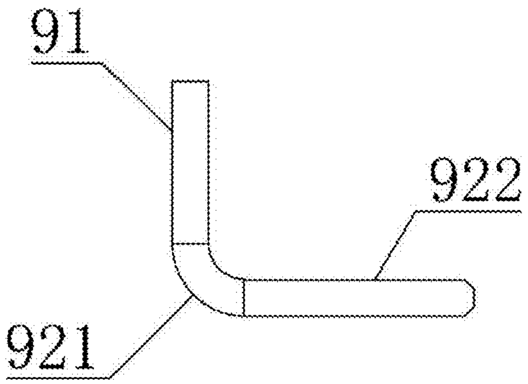
FIG. 23 is a schematic structural left view of the second conductive member according to Embodiment 8.
Figure 24:
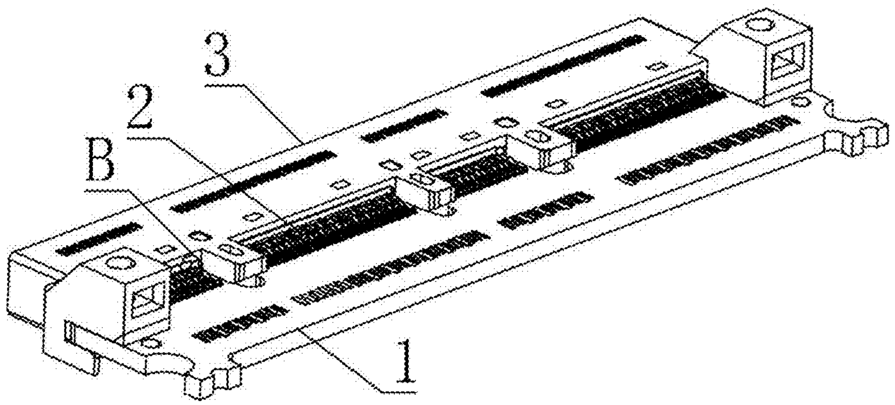
FIG. 24 is a schematic perspective structural diagram of a cable connector according to Embodiment 8.
Figure 25:
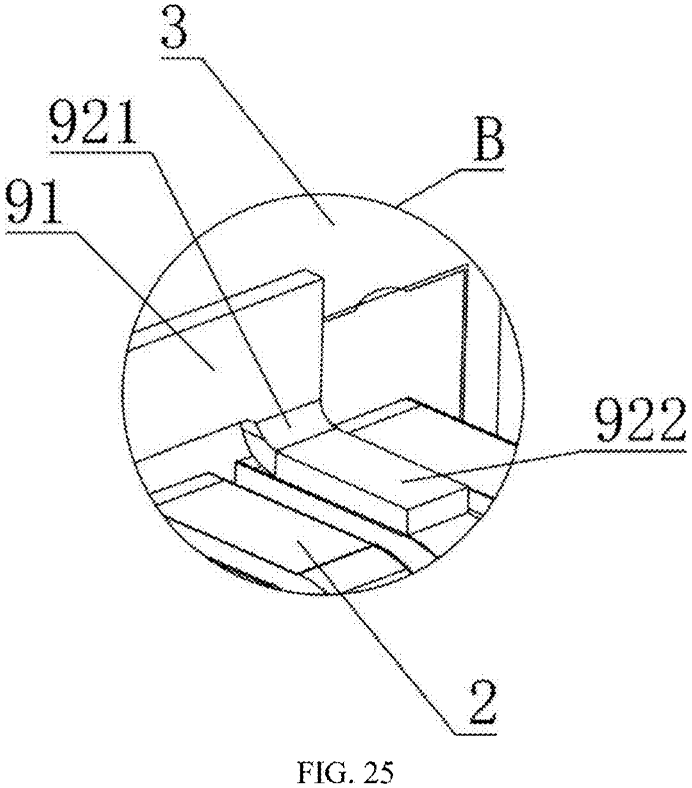
FIG. 25 is an enlarged schematic diagram of B of FIG. 24.
Figure 26:
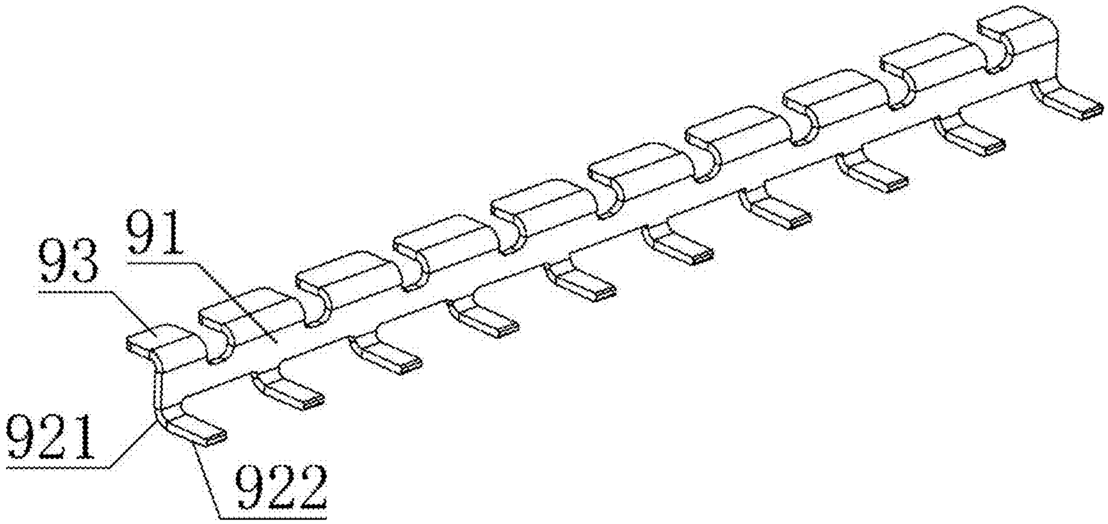
FIG. 26 is a schematic perspective structural diagram of a second conductive member according to Embodiment 9.
Figure 27:
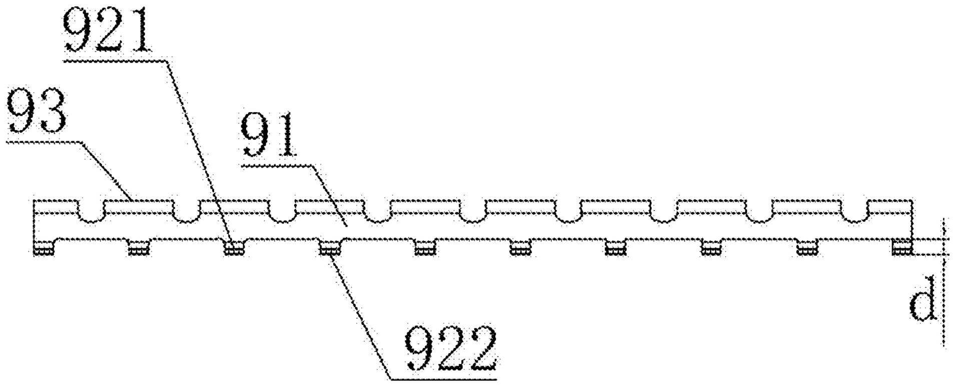
FIG. 27 is a schematic structural front view of the second conductive member according to Embodiment 9.
Figure 28:
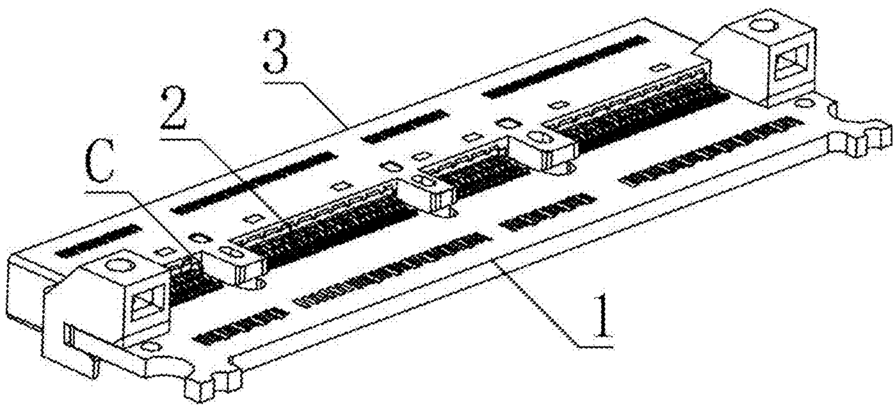
FIG. 28 is a schematic perspective structural diagram of a cable connector according to Embodiment 9.
Figure 29:
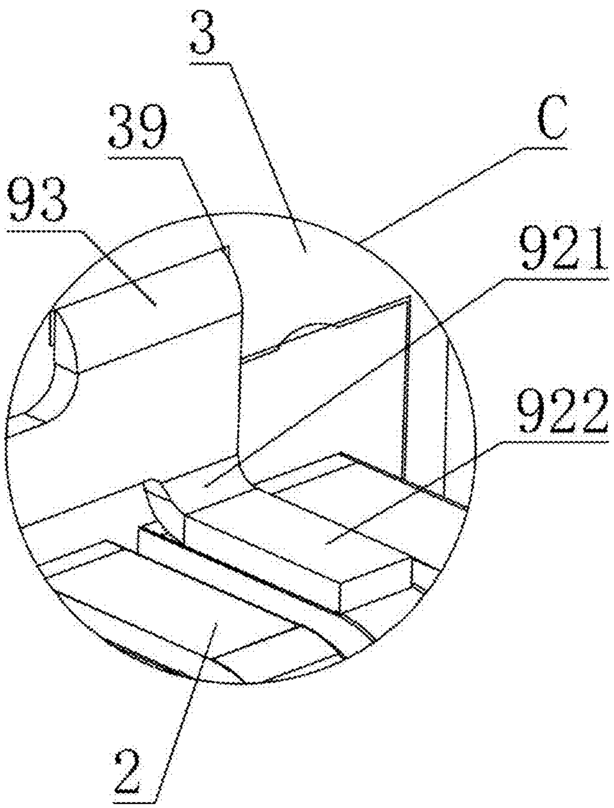
FIG. 29 is an enlarged schematic diagram of C of FIG. 28.

As shown in FIG. 20, a difference between this embodiment and Embodiment 5 lies in different conductive units 81.

The first conductive member 8 of this embodiment forms a conductive unit 81 by bending a metal sheet. Two adjacent conductive units 81 are separately connected and arranged. Specifically, in this embodiment, two adjacent conductive units 81 are connected into a whole by clamping. A plurality of first conductive members 8 connect a plurality of grounding terminals 21.

Embodiment 8

As shown in FIGS. 21 to 25, this embodiment differs from Embodiment 1 in that this embodiment further includes second conductive member 9.

A part of the terminal group 2 extends out of the insulative body 3, and the second conductive member 9 is located outside the insulative body 3 and is electrically connected to the grounding terminal 21 of the terminal group 2. The second conductive member 9 includes conductive body 91 and a plurality of conductive sheets 92 connected to the conductive body 91 and configured to electrically connect grounding terminals 21. Each of the conductive sheets 92 includes bent portion 921 and horizontal portion 922. The horizontal portion 922 is connected to the conductive body 91 through the bent portion 921. A contact surface between the horizontal portion 922 and the grounding terminal 21 (a lower surface of the horizontal portion 922) and an end face of the conductive body 91 adjacent to the conductive sheet 92 (a lower end face of the conductive body 91) is d, and in this embodiment, d=0.30 mm. The conductive sheet 92 is integrally formed with the conductive body 91, and the conductive sheet 92 is formed by extending and bending the conductive body 91 rightward. The plurality of conductive sheets 92 are spaced apart in a direction of the length of the conductive body 91. Through the arrangement of the horizontal portion 922, there is a relatively large contact surface between the conductive sheet 92 and the grounding terminal 21, which ensures the effective conduction, and the distance of d is designed as required to achieve good crosstalk improvement performance.

Figure 30:
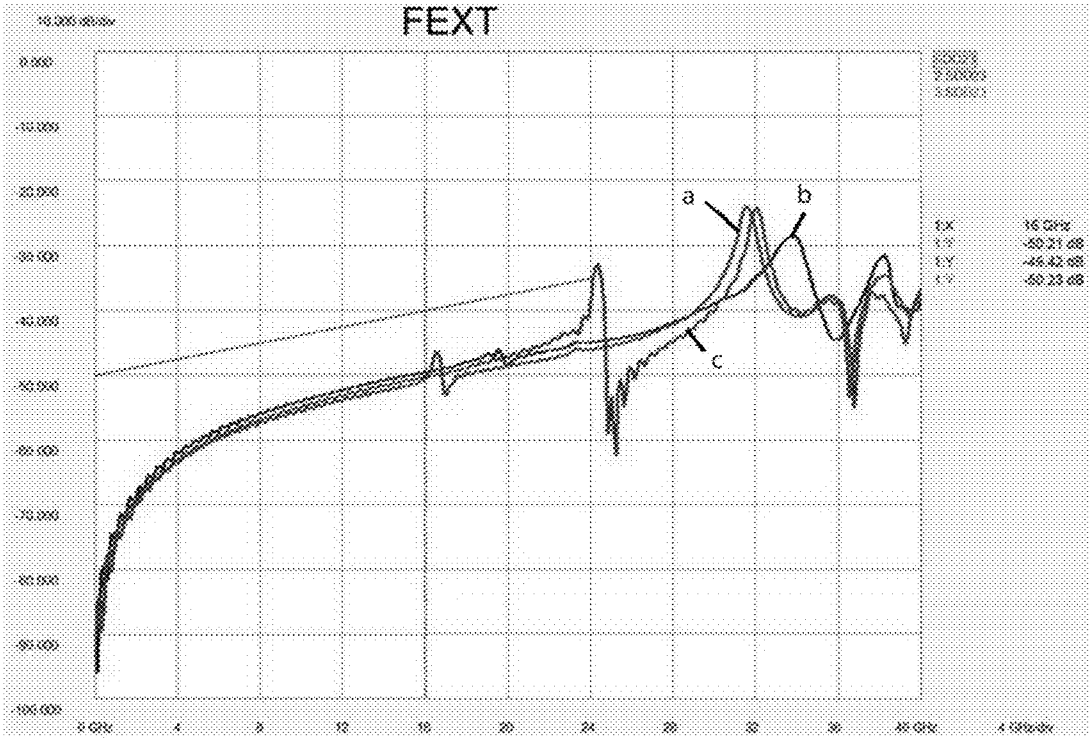
FIG. 30 is a diagram of comparison between signal integrity (SI) data of the cable connector according to Embodiment 8, SI data of a cable connector with a grounding plate arranged in an insulative body conventionally, and SI data of a cable connector without a grounding plate.

A diagram of comparison between SI data of the cable connector according to this embodiment, SI data of a cable connector with a grounding plate arranged in an insulative body 3 conventionally, and SI data of a cable connector without a grounding plate is shown in FIG. 30. It can be seen from the figure that the cable connector without a grounding plate has a high risk of resonance at 16 GHz (line a in the figure); in this embodiment, the grounding plate is arranged outside the insulative body 3 (mainly referring to a joint between the grounding plate and the grounding terminal 21), so that an overall amplitude is slightly increased and there is no obvious resonance (line b in the figure); and conventionally, the grounding plate is arranged in the insulative body 3, and there is a high risk of resonance at 24 GHz (line c in the figure). Crosstalk is effectively improved through the design of the second conductive member 9 in this embodiment.

Embodiment 9

As shown in FIGS. 26 to 29, this embodiment differs from Embodiment 8 in that this embodiment further has folded edges 93.

A plurality of folded edges 93 are provided on the conductive body 91, and a plurality of insertion holes 39 for the folding edges 93 to be inserted in are provided in the insulative body 3. A bending direction of the folded edges 93 is opposite to that of the conductive sheet 92 (bending leftward). The plurality of folded edges 93 are spaced apart in the direction of the length of the conductive body 91. Through the arrangement of the folded edge 93 and the cooperation with the insertion holes 39, the fixation of the second conductive member 9 is facilitated.

Both the first conductive member 8 and the second conductive member 9 may be made of a metal, conductive plastic or any other suitable material.

Embodiment 10

Figure 31:
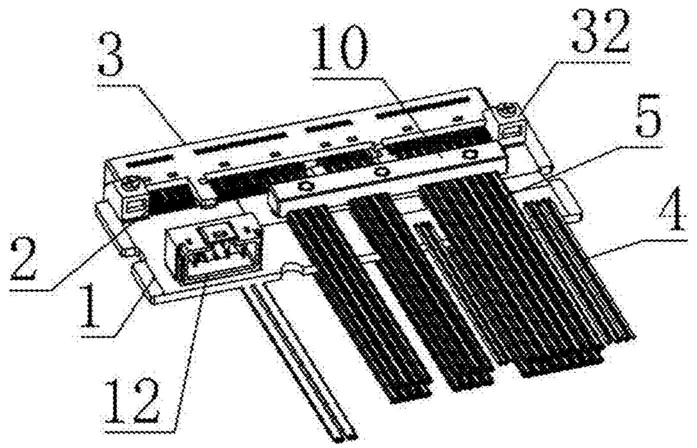
FIG. 31 is a perspective view of Embodiment 10.

As shown in FIG. 31, a difference between this embodiment and Embodiment 1 lies in different cable fixing assemblies 10.

The cable fixing assembly 10 of this embodiment includes second housing 104 and adhesive layer 105. Accommodating cavity 106 with an opening at the bottom is provided in the second housing 104, and adhesive injection portion 107 communicating with the accommodating cavity 106 is arranged on a wall of the top or a side edge of the second housing 104. In this embodiment, three adhesive injection portions 107 are arranged, and all the three adhesive injection portions 107 are arranged above the second housing 104.

Figure 32:
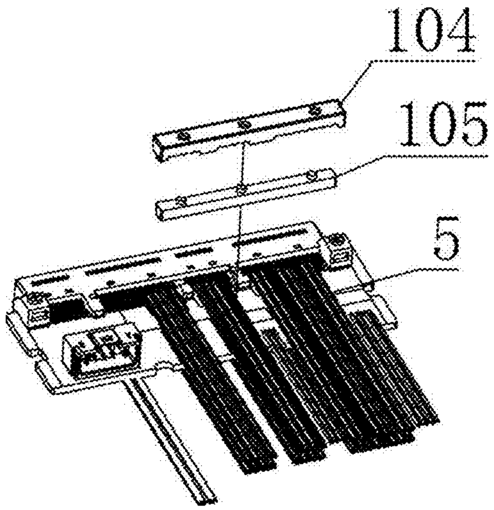
FIG. 32 is a schematic exploded view of FIG. 31.
Figure 33:
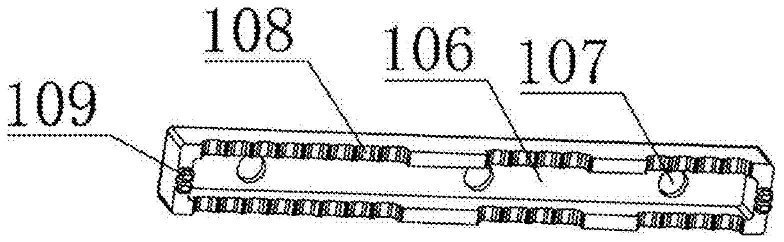
FIG. 33 is a schematic structural diagram of a second housing according to Embodiment 10.
Figure 34:
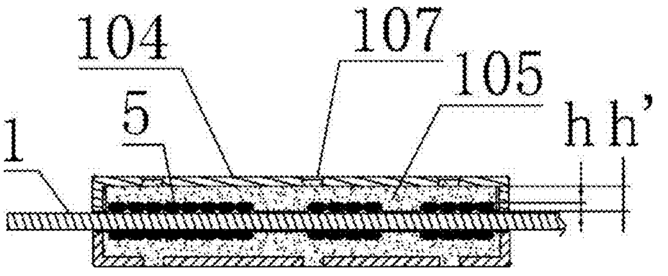
FIG. 34 is a schematic cross-sectional view showing mounting of a first cable, a circuit board and a cable fixing assembly according to Embodiment 10.

As shown in FIGS. 32 and 33, the second housing 104 is mounted above a non-electrical connection area (i.e., an insulating layer) of the first cable 5 and fixed to the circuit board 1, two sides of the accommodating cavity 106 of the second housing 104 are provided with wiring ducts 108, and each of the wiring ducts 108 is tightly pressed above the first cable 5 to limit the cable therein. Connecting pins 109 are arranged on two sides of a lower portion of the second housing 104, and the connecting pins 109 are welded and fixed to the circuit board 1. As shown in FIG. 34, a height h' of the accommodating cavity 106 is 2-3 times a height h of the cable, that is, h'=(2-3)h. Through the setting of this height relationship, the adhesive layer 105 can well fix the cable and does not cause a waste.

The adhesive layer 105 is formed by injecting a glue solution into the accommodating cavity 106 by means of the adhesive injection portion 107 and curing. The adhesive layer 105 may be formed by injecting any curable glue into the second housing 104.

Embodiment 11

Figure 35:
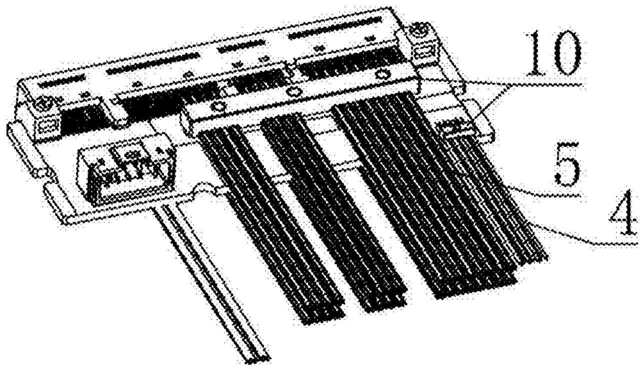
FIG. 35 is a perspective view of Embodiment 11.

As shown in FIG. 35, this embodiment differs from Embodiment 10 in that the cable fixing assembly 10 is also arranged above the non-electrical connection area of the second cable 4 (i.e., the insulating layer). The second housing 104 tightly presses the top of the insulating layer of the second cable 4 and is fixed to the circuit board 1.

Embodiment 12

Figure 36:
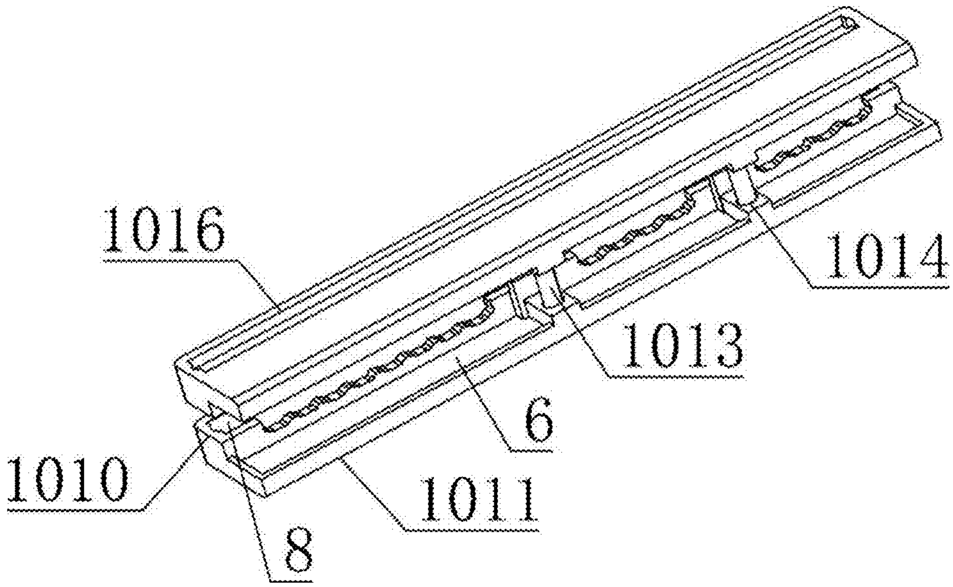
FIG. 36 is a schematic perspective structural diagram of a cable fixing assembly according to Embodiment 12 (colloid not shown).
Figure 37:
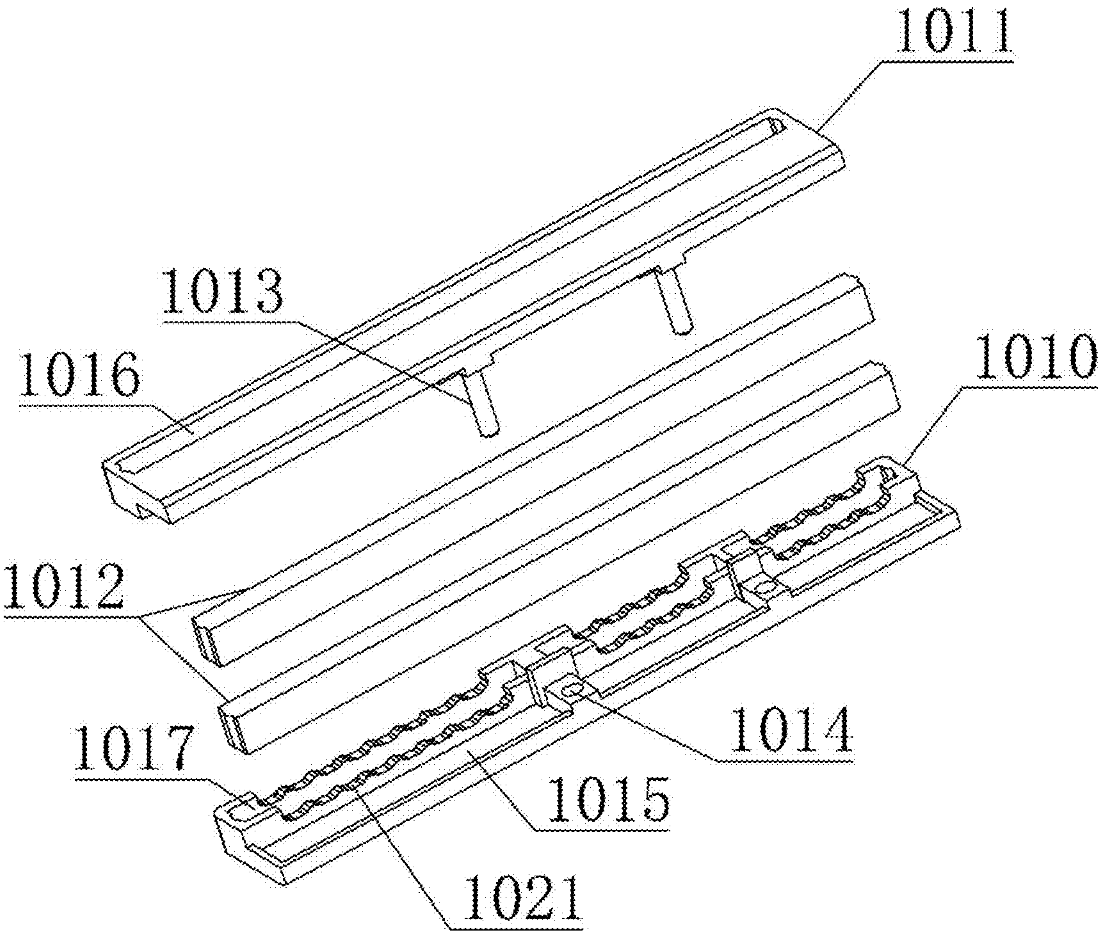
FIG. 37 is a schematic perspective structural exploded view of the cable fixing assembly according to Embodiment 12.

As shown in FIGS. 36 and 37, a difference between this embodiment and Embodiment 1 is different cable fixing assemblies 10.

The cable fixing assembly 10 is fixed to the circuit board 1. The cable fixing assembly 10 includes two adhesive injection limiting portions 1010 and two blocking portions 1011. Each of the adhesive injection limiting portions 1010 is connected to one blocking portion 1011, and the two blocking portions 1011 are connected by connecting member 1013. The blocking portion 1011 is connected to a side of the adhesive injection limiting portion 1010, and the blocking portion 1011 is configured to block a welding position between the cable and the terminal group 2. In this embodiment, the first cable 5 is taken as an example, the adhesive injection limiting portion 1010 is filled with colloid 1012, and the colloid 1012 connects the adhesive injection limiting portion 1010, the first cable 5 and the circuit board 1 into a whole.

The connecting member 1013 of this embodiment is a connecting column. An upper end of the connecting member 1013 is fixed to a bottom of the upper blocking portion 1011, and the lower blocking portion 1011 has a positioning hole 1014. A lower end of the connecting member 1013 extends into the positioning hole 1014, and is in insertion fit or hot melt connection with the positioning hole 1014.

In this embodiment, an inner side of the blocking portion 1011 has three surrounding grooves 1015 that surround a welding position between the first cable 5 and the terminal group 2. The welding position cannot be squeezed while the welding position is protected.

In this embodiment, there is one adhesive injection port 1016, and each adhesive injection cavity 1017 communicates with the adhesive injection port 1016, and the adhesive injection port 1016 is an elongated hole and spans each adhesive injection cavity 1017.

The periphery of each adhesive injection cavity 1017 is closed, and such an arrangement facilitates the limiting to the colloid 1012.

An inner side wall of the adhesive injection limiting portion 1010 is provided with limiting groove 1021, and the first cable 5 can pass through the limiting groove 1021. The first cable 5 is pressed by the limiting groove 1021 to achieve a limiting function.

The adhesive injection limiting portions 1010 and the blocking portions 1011 on the upper side and the lower side are located on the upper side and the lower side of the circuit board 1 respectively, to fix and limit cables on the upper side and the lower side of the circuit board 1 respectively.

Figure 38:
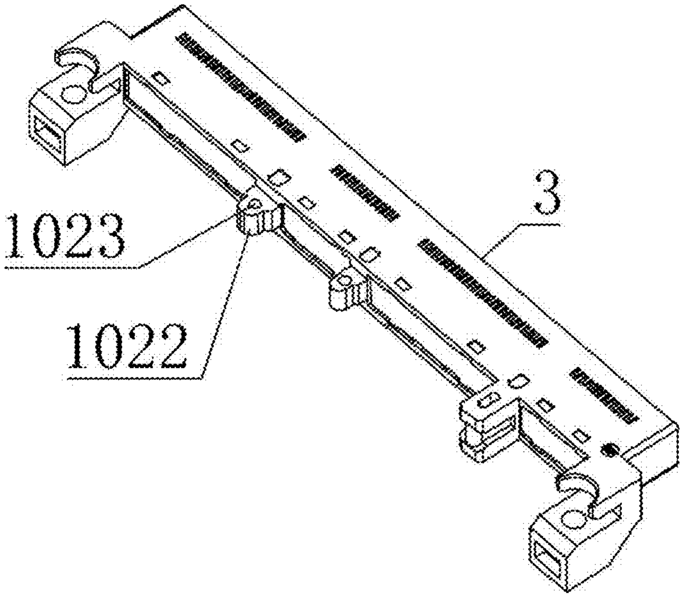
FIG. 38 is a schematic perspective structural diagram of an insulative body according to Embodiment 12.

As shown in FIG. 38, a side wall of the insulative body 3 is provided with protruding portion 1022, the protruding portion 1022 has second through hole 1023, and the connecting member 1013 passes through the second through hole 1023.

Embodiment 13

Figure 39:
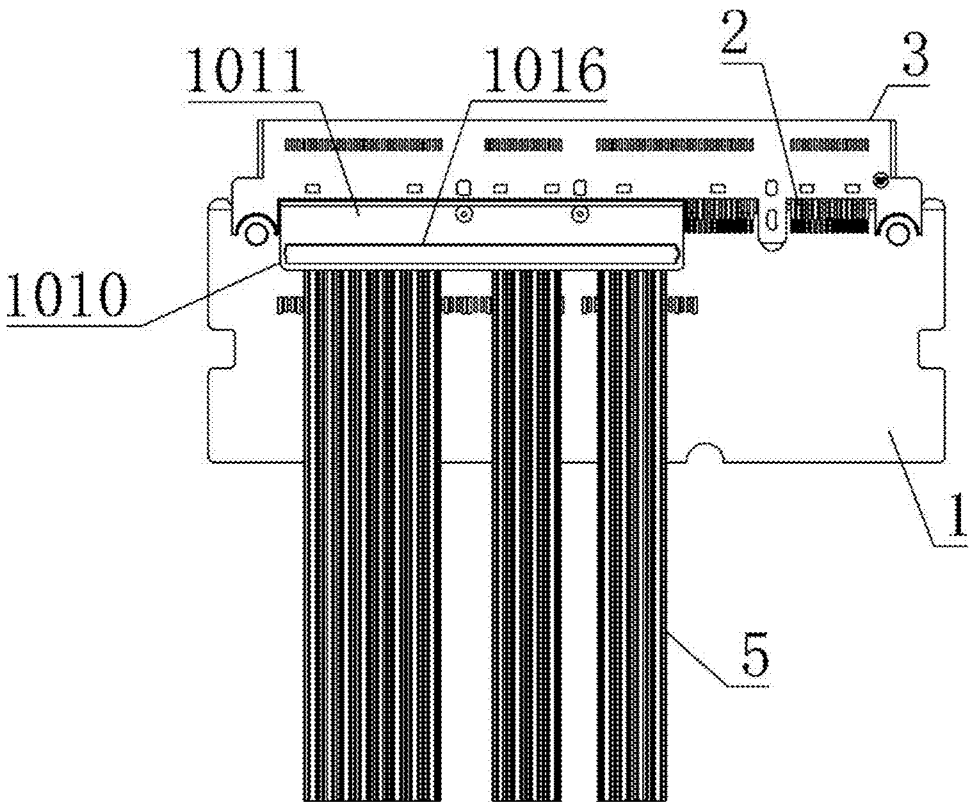
FIG. 39 is a schematic structural diagram of a cable connector according to Embodiment 13.
Figure 40:
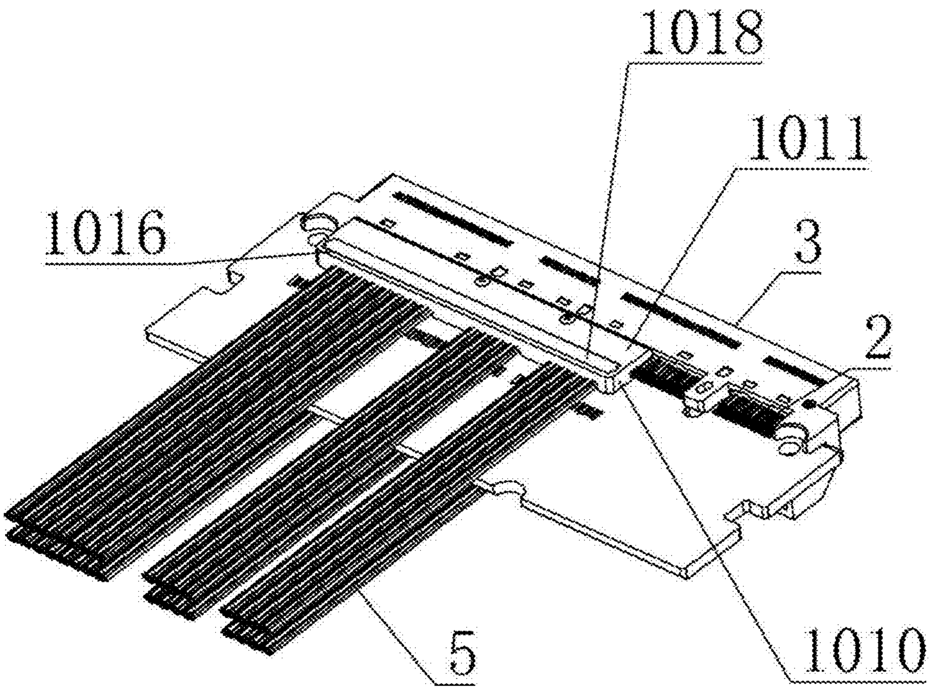
FIG. 40 is a schematic perspective structural diagram of a cable connector according to Embodiment 13.
Figure 41:
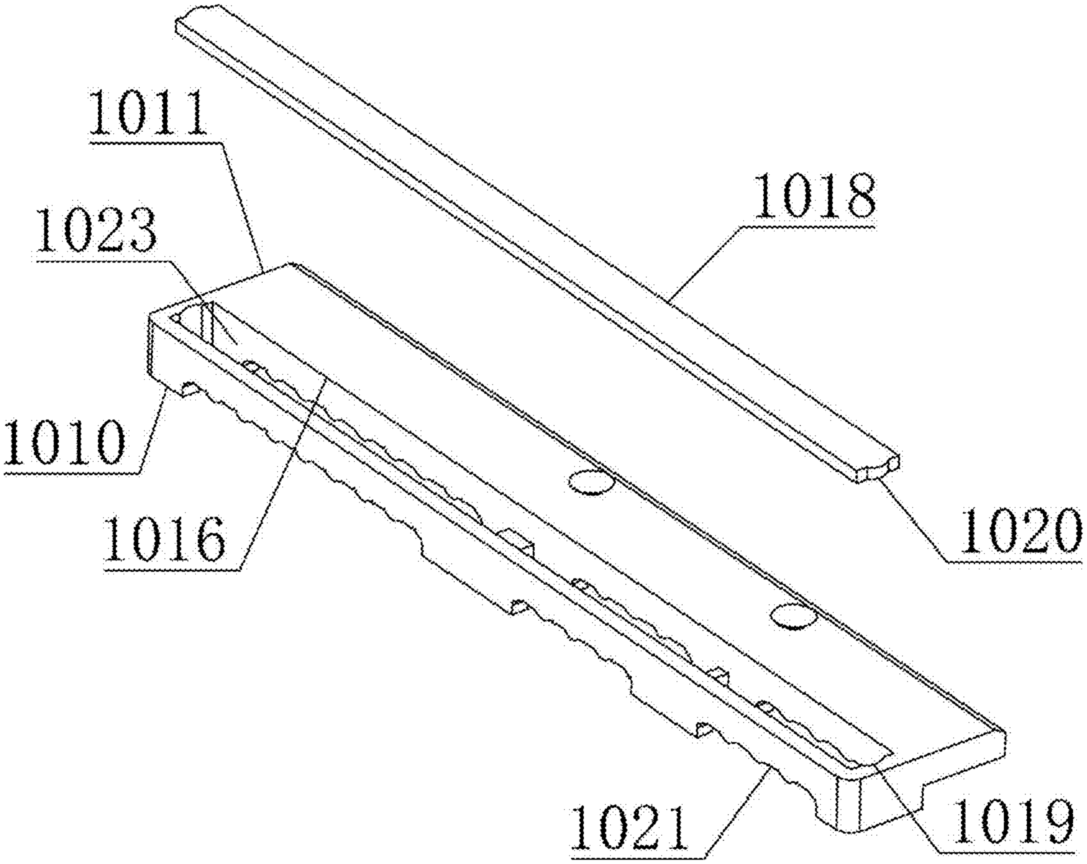
FIG. 41 is a schematic partial perspective structural exploded view of a cable fixing assembly according to Embodiment 13.

As shown in FIGS. 39 to 41, the difference of this embodiment over Embodiment 12 is as follows.

Cover plate 1018 is further included, where the cover plate 1018 covers the adhesive injection port 1016. Two end portions of the adhesive injection port 1016 in the length direction are provided with arc-shaped grooves 1019, and two end portions of the cover plate 1018 in the length direction are provided with arc-shaped clamping blocks 1020, which facilitates disassembly and assembly of the cover plate 1018.

Embodiment 14

Figure 42:
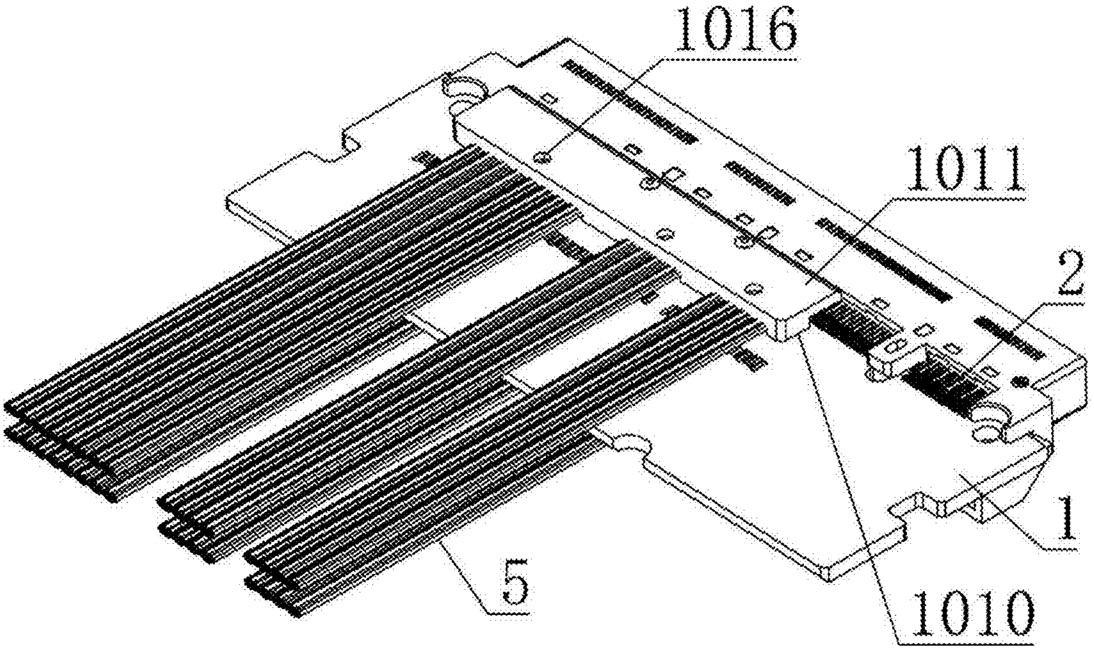
FIG. 42 is a schematic perspective structural diagram of a cable connector according to Embodiment 14.

As shown in FIG. 42, the difference of this embodiment over Embodiment 12 is as follows.

In this embodiment, an outer side wall of the adhesive injection limiting portion 1010 is provided with three adhesive injection ports 1016, three adhesive injection cavities 1017 are provided inside the adhesive injection limiting portion 1010, and each of the adhesive injection cavities 1017 communicates with one adhesive injection port 1016.

Certainly, in other embodiments, the blocking portion 1011 may also be configured to block the welding position between the second cable 4 and the circuit board 1; and the two adhesive injection limiting portions 1010 may also be connected by a connecting member 1013.

Embodiment 15

Figure 43:
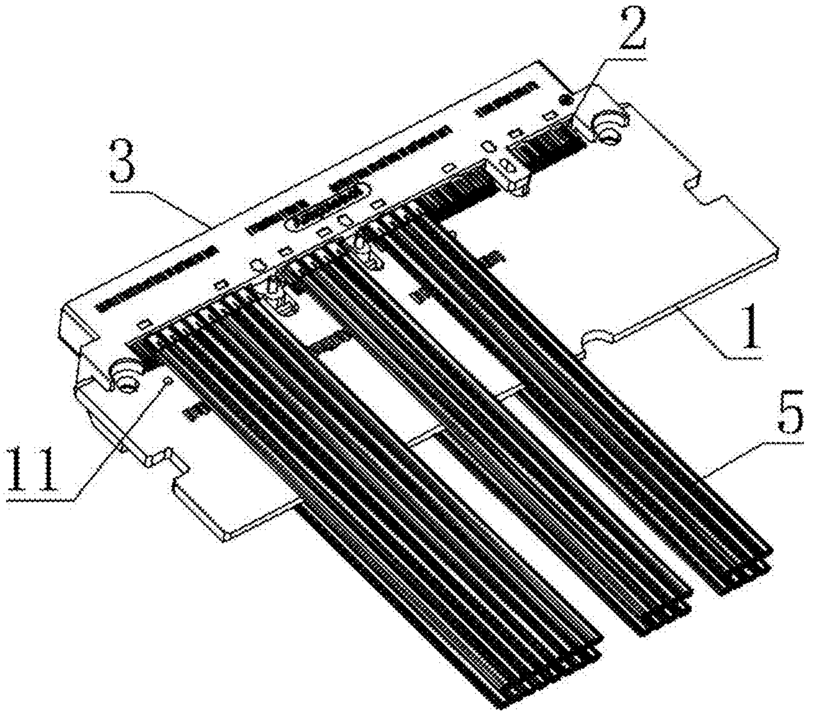
FIG. 43 is a schematic perspective structural diagram of a cable connector according to Embodiment 15.

As shown in FIG. 43, the difference of this embodiment over Embodiment 12 is as follows.

The circuit board 1 has at least one adhesive guide channel 11 penetrating through the circuit board 1, and the adhesive injection limiting portion 1010 surrounds the adhesive guide channel 11. In this embodiment, two adhesive guide channels 11 are located on a left side and a right side of the cable fixing assembly respectively. Through the arrangement of the adhesive guide channel 11, holding power of the colloid 1012 can be enhanced.

Embodiment 16

Figure 44:
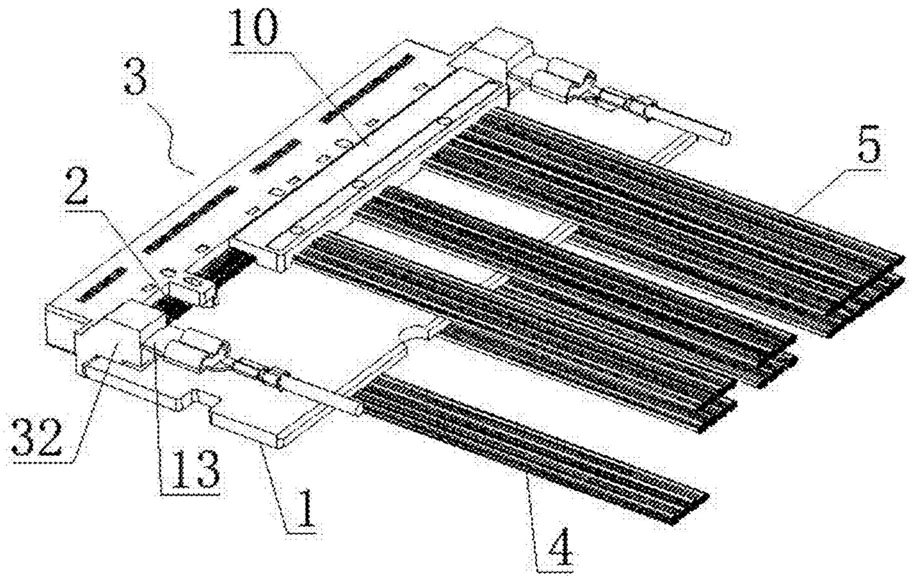
FIG. 44 is a schematic perspective structural diagram of a cable connector according to Embodiment 16.
Figure 45:
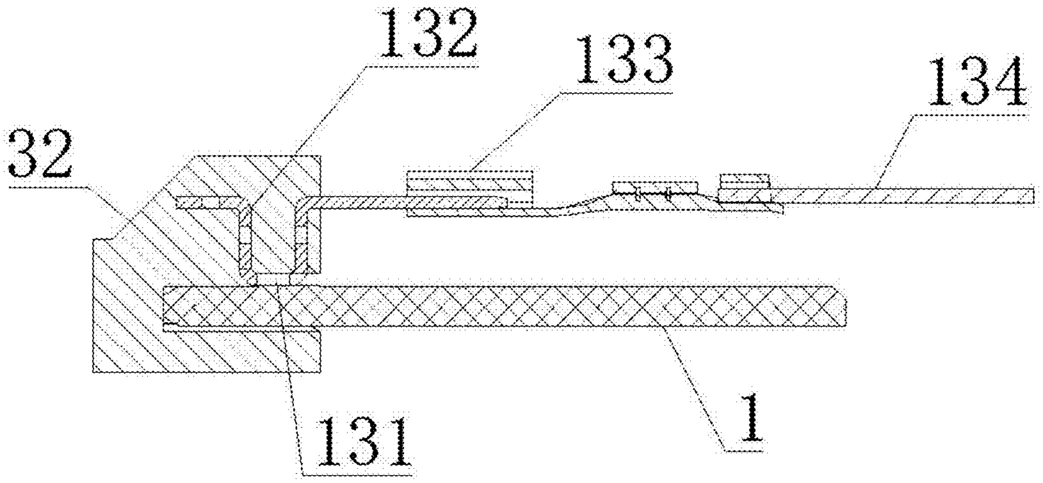
FIG. 45 is a schematic cross-sectional structural diagram of the cable connector according to Embodiment 16.

As shown in FIGS. 44 and 45, a cable connector in this embodiment includes insulative body 3, terminal group 2, circuit board 1, a plurality of cables, power supply connecting member 13, and cable fixing assembly 10.

The terminal group 2 is mounted in the insulative body 3. The circuit board 1 is electrically connected to the terminal group 2, and the circuit board 1 is a PCBA or a PCB. The cables include second cable 4 and first cables 5. The second cables 4 are electrically connected to circuit board 1, and the first cables 5 are electrically connected to the terminal group 2. The mounting portions 32 are arranged at two side ends of the butt portion 31, and the circuit board 1 is fixedly connected to the mounting portions 32. The power supply connecting member 13 includes contact portion 131, connecting portion 132, conductive terminal 133, and power line 134. A right end of the connecting portion 132 is connected to the conductive terminal 133, and a right end of the conductive terminal 133 is connected to the power line 134. The connecting portion 131 is arranged in the mounting portion 32, the connecting portion 132 extends out of the mounting portion 32 and is electrically connected to a power supply, and the contact portion 131 is configured to electrically connect the circuit board 1. A manner of injection molding with the insulative body is used, making the mounting convenient. Moreover, the cable fixing assembly is not directly arranged on the circuit board, but arranged on the insulative body, so that the dimension of the circuit board is not required, and the adaptability is wide.

Embodiment 17

Figure 46:
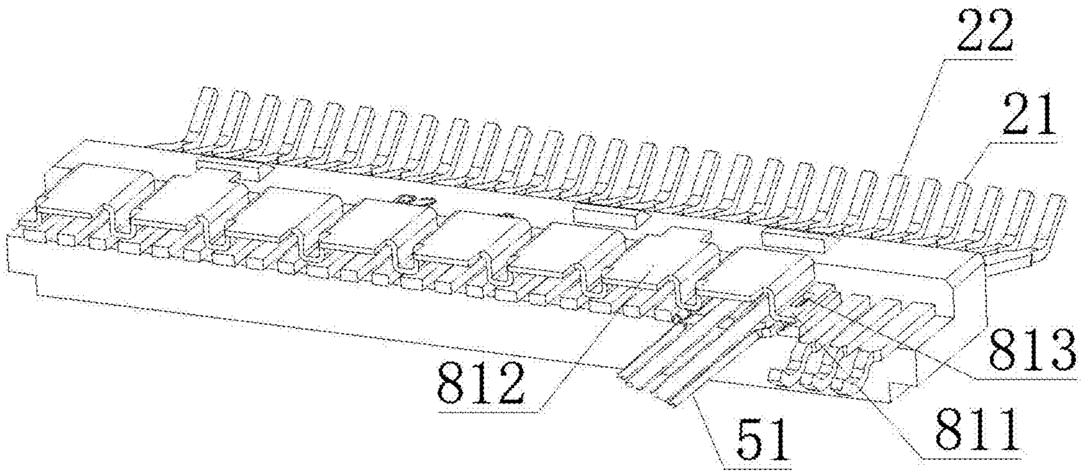
FIG. 46 is a schematic partial perspective structural diagram of a cable connector according to Embodiment 17.

As shown in FIG. 46, the difference of this embodiment over Embodiment 6 is as follows.

The extension portion is provided with channel 813 for a connecting object to pass through, and a part of the grounding terminal and a part of the ground wire are both located below the channel.

The channel in this embodiment is a through hole that vertically penetrates the extension portion, and the connecting object is solder. In a solution in which the ground wire is arranged between the extension portion and the grounding terminal, through the arrangement of the channel, the solder can enter through the channel to be connected to the grounding terminal and the ground wire, so as to improve a welding surface and realize the stable electrical connection between the grounding terminal, the ground wire and the first conductive member. In this embodiment, the channel and the ground wire are oppositely arranged up and down, so that the solder can be stably connected to the ground wire after passing through the channel.

In this embodiment, the entire first cable is welded first, that is, the ground wire and signal wire of the first cable are correspondingly welded on upper surfaces of the grounding terminal and the signal terminal of the terminal group respectively. Then, the first conductive member is welded to the ground wire. Compared with a conventional welding method, the mounting of the first cable does not need to be divided into two steps, and the first cable is integrally welded and mounted in one step.

What is claimed is:

1. A cable connector assembly, comprising: an insulative body, a terminal group, a circuit board, and a plurality of cables, wherein the terminal group is mounted in the insulative body, and the terminal group comprises a first conductive terminal group disposed in a first region of the insulative body and a second conductive terminal group disposed in a second region of the insulative body, the first and second regions being physically separated by at least one intermediate partition within the insulative body; the circuit board is electrically connected to the first conductive terminal group and/or the second conductive terminal group; the plurality of cables comprise first cables, and the first cables are electrically connected to the second conductive terminal group;

wherein the insulative body includes a plurality of accommodating spaces defined by the at least one intermediate partition, each accommodating space being configured to receive at least a portion of the terminal group; and wherein the terminal group is arranged in groups in the plurality of accommodating spaces; and wherein the insulative body further comprises a plurality of partition pieces, wherein the plurality of partition pieces are located on a rear side of the butt portion and correspond to the plurality of intermediate partitions in position, the first cables are arranged in groups, and each of the plurality of partition pieces spaces apart two adjacent groups of first cables.

2. The cable connector assembly according to claim 1, further comprising a second cable, wherein the second cable is electrically connected to the circuit board.

3. The cable connector assembly according to claim 1, wherein the insulative body comprises a butt portion and mounting portions;

the butt portion comprises an upper wall, a lower wall, two first side walls and the plurality of intermediate partitions, wherein the two first side walls are located at two side ends of the butt portion respectively and connected to the upper wall and the lower wall; the upper wall and the lower wall are provided with the plurality of intermediate partitions, and the plurality of intermediate partitions divide the insulative body into a plurality of accommodating spaces for mounting the terminal group;

the terminal group is arranged in groups in the plurality of accommodating spaces, respectively; and the mounting portions are arranged at the two side ends of the butt portion, and the circuit board is fixedly connected to the mounting portions.

4. The cable connector assembly according to claim 3, wherein a middle portion of each of the plurality of partition pieces is provided with a first avoidance groove, a middle portion of each of the mounting portions is provided with a second avoidance groove, coaxial mounting positions are provided above and below the second avoidance groove, the circuit board is provided with a first through hole, the circuit board is inserted into the first avoidance groove and the second avoidance groove to allow the first through hole to be coaxial with the coaxial mounting positions, and a connecting body passes through the coaxial mounting positions and the first through hole to realize connection and locking between the insulative body and the circuit board.

5. The cable connector assembly according to claim 4, wherein an inner wall of the second avoidance groove is a first reference end face;

at least one protruding portion is arranged on an inner wall of at least one accommodating space of the plurality of accommodating spaces;

an end face of the at least one protruding portion is a second reference end face, wherein the end face of the at least one protruding portion is adjacent to an opening of the at least one accommodating space, and an insert abuts against the second reference end face; and a vertical distance between the first reference end face and the second reference end face is D, and D is greater than 2 mm.

6. The cable connector assembly according to claim 5, wherein the at least one protruding portion is arranged on an inner wall of each of the plurality of accommodating spaces.

7. The cable connector assembly according to claim 3, wherein at least one positioning portion is provided on a side of the butt portion, and the at least one positioning portion and the mounting portions are located on a same side;

a side wall of the at least one positioning portion is provided with a positioning groove for positioning and guiding the circuit board and a clamping groove; and the clamping groove and the positioning groove are located in different planes.

8. The cable connector assembly according to claim 3, wherein at least one protruding portion is arranged on an inner wall of at least one accommodating space of the plurality of accommodating spaces; and an end face of the at least one protruding portion is an inclined surface, wherein the end face of the at least one protruding portion is adjacent to an opening of the at least one accommodating space, and an insert abuts against the inclined surface.

9. The cable connector assembly according to claim 1, wherein a part of the first conductive terminal group extends out of the insulative body and is electrically connected to the circuit board;

the terminal group further comprises grounding terminals, a signal terminal is arranged between adjacent grounding terminals, the terminal group further comprises a first conductive member, and the first conductive member is electrically connected to a grounding terminal of the terminal group extending out of the insulative body or a grounding terminal on the circuit board;

the first conductive member connects at least two of the grounding terminals; and a ground wire of each of the first cables is electrically connected to the first conductive member.

10. The cable connector assembly according to claim 9, wherein the first conductive member comprises at least one conductive unit, and each of the at least one conductive unit connects two adjacent grounding terminals.

11. The cable connector assembly according to claim 10, wherein each of the at least one conductive unit comprises extension portions and a covering portion;

two opposite ends of the covering portion are provided with the extension portions;

the extension portions are electrically connected to the grounding terminals; and the covering portion covers a signal terminal pair between adjacent grounding terminals.

12. The cable connector assembly according to claim 10, wherein the ground wire is connected to or abuts against each of the at least one conductive unit.

13. The cable connector assembly according to claim 1, further comprising a second conductive member, wherein a part of the terminal group extends out of the insulative body; and the second conductive member is located outside the insulative body and is electrically connected to the grounding terminals of the terminal group.

14. The cable connector assembly according to claim 13, wherein the second conductive member comprises a conductive body and a plurality of conductive sheets, wherein the plurality of conductive sheets are connected to the conductive body and configured to electrically connect the grounding terminals;

each of the plurality of conductive sheets comprises a bent portion and a horizontal portion;

the horizontal portion is connected to the conductive body through the bent portion; and a distance between a contact surface of the horizontal portion and each of the grounding terminals and an end face of the conductive body adjacent to each of the conductive sheets is d, and d=0.05 mm–0.50 mm.

15. The cable connector assembly according to claim 1, further comprising a cable fixing assembly, wherein a non-electrical connection area of each of the first cables is fixed to the circuit board and/or the insulative body through the cable fixing assembly, and the cable fixing assembly comprises an adhesive layer and/or a housing configured to secure the first cables to the circuit board and/or the insulative body.

16. The cable connector assembly according to claim 15, wherein the cable fixing assembly comprises an adhesive layer, and the adhesive layer bonds and fixes an insulating layer of each of the first cables to the circuit board and/or the insulative body.

17. The cable connector assembly according to claim 15, wherein the cable fixing assembly comprises a first housing and a covering layer;

the covering layer covers an electrical connection area between each of the first cables and the terminal group or/and an electrical connection area between the second cable and the circuit board; and the first housing is arranged above the covering layer to tightly press the covering layer, and the first housing is fixedly connected to the circuit board and/or the insulative body, wherein the covering layer is made of an insulating or low dielectric constant material.

18. The cable connector assembly according to claim 15, wherein the cable fixing assembly comprises a first housing and a covering layer:

the covering layer covers an insulating layer of each of the first cables or/and an insulating layer of the second cable; and the first housing is arranged above the covering layer to tightly press the covering layer, and the first housing is fixedly connected to the circuit board and/or the insulative body.

19. The cable connector assembly according to claim 1, further comprising a power supply connecting member, wherein the power supply connecting member comprises a contact portion and a connecting portion;

the connecting portion is arranged in each of the mounting portions, and the connecting portion extends out of each of the mounting portions and is electrically connected to a power supply; and the contact portion is configured to electrically connect the circuit board.

* * * * *